(12) United States Patent
Takano et al.

(10) Patent No.: US 7,800,523 B2
(45) Date of Patent: Sep. 21, 2010

(54) SIGNAL PROCESSOR, CONTROL METHOD, AND WIRELESS COMMUNICATION DEVICE

(75) Inventors: Hiroaki Takano, Saitama (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 12/361,481

(22) Filed: Jan. 28, 2009

(65) Prior Publication Data

US 2009/0219184 A1   Sep. 3, 2009

(30) Foreign Application Priority Data

Feb. 4, 2008   (JP)   ............... P2008-024458

(51) Int. Cl.
*H03M 1/12* (2006.01)
*H04B 7/04* (2006.01)
*H04B 17/00* (2006.01)

(52) U.S. Cl. .............. 341/141; 341/120; 455/226.1; 455/103; 455/132; 375/260

(58) Field of Classification Search ............. 341/120, 341/141, 155; 455/103, 132, 226.1; 375/260
See application file for complete search history.

(56) References Cited

U.S. PATENT DOCUMENTS 7,541,952 B1 * 6/2009 Sankaran et al. ............ 341/120

2003/0203743 A1 * 10/2003 Sugar et al. ................. 455/137
2008/0095260 A1 * 4/2008 Vaidyanathan ............. 375/267
2008/0139156 A1 * 6/2008 Behzad et al. .............. 455/296
2009/0227214 A1 * 9/2009 Georgantas et al. ........... 455/86

OTHER PUBLICATIONS

IEEE P802.11n/D3.02, prepared by the 80 2.11 Working Group of the 802 Committee, 2007.

* cited by examiner

*Primary Examiner*—Howard Williams
(74) *Attorney, Agent, or Firm*—Finnegan, Henderson, Farabow, Garrett & Dunner, L.L.P.

(57) ABSTRACT

There is provided a signal processor with a plurality of antennas connected for transmitting and receiving wireless signals, including a plurality of analog reception processing units, AD converters, DA converters, and analog transmission processing units, wherein each of the analog reception processing units converts the wireless signal received through the antenna into an analog baseband signal and outputs the signal to the AD converter, each of the DA converters converts the digital baseband signal into analog format and outputs the signal, and each of the analog transmission processing units shifts the frequency band of the analog baseband signal output from the DA converter to the high frequency side. The signal processor further includes a transmission switch which switches among the DA converters respectively connected to the analog transmission processing units and a reception switch which switches among the AD converters respectively connected to the analog reception processing units.

8 Claims, 19 Drawing Sheets

SIGNAL PROCESSOR, CONTROL METHOD, AND WIRELESS COMMUNICATION DEVICE

CROSS REFERENCES TO RELATED APPLICATIONS

The present invention contains subject matter related to Japanese Patent Application JP 2008-024458 filed in the Japan Patent Office on Feb. 4, 2008, the entire contents of which being incorporated herein by reference.

BACKGROUND OF THE INVENTION

1. Field of the Invention

The present invention relates to a signal processor, a control method, and a wireless communication device.

2. Description of the Related Art

In these days, research and development on a MIMO (Multiple Input Multiple Output) communication system described, for example, in "IEEE802.11n" (prepared by the 802.11 Working Group of the 802 Committee, 2007) is performed widely. The MIMO communication system is a communication system in which a plurality of antennas is provided on each wireless communication device, the wireless communication device receives signals multiplied spatially transmitted from the antennas, through the antennas, and the received signals are separated by using a signal separation technique such as an inverse matrix operation. According to the MIMO communication system, it is possible to improve the transmission speed.

More specifically, the wireless communication device has to include a plurality of DA converters, analog transmission processing units, analog reception processing units, and AD converters respectively, in addition to the antennas, in order to realize the MIMO communication system. Each of the analog transmission processing units frequency-converts a baseband signal of analog format output from the DA converter, for example, into a high frequency signal of 5 GHz band and the antenna transmits the high frequency signal as a wireless signal. Each of the analog reception processing units down-converts the high frequency signal received by the antenna as the wireless signal into the baseband signal of analog format and outputs it to the AD converter.

Such a wireless communication device has to calibrate property errors in the antenna, the DA converter, the analog transmission processing unit, the analog reception processing unit, and the AD converter, or to do calibration there. Hereinafter, the calibration for the analog transmission processing unit, the analog reception processing unit, the DA converter, and the AD converter is referred to as an IQ calibration and the calibration for the antenna is referred to as an antenna calibration.

There is a case where IQ calibration includes a series of flow of returning back a reference signal through a path of the DA converter, the analog transmission processing unit, the analog reception processing unit, and the AD converter in this order and calibrating the property errors in each component mentioned above, according to the returned reference signal. While, there is a case where the antenna calibration includes a series of flow of transmitting a reference signal through the DA converter, the analog transmission processing unit, and the antenna, returning back another reference signal received in another antenna through the path of the analog reception processing unit and the AD converter, and calibrating the property error of the antenna according to the returned reference signal.

Here, the calibration in the wireless communication device has to satisfy, for example, the following three constraints.

(1) A combination of the analog transmission processing unit and the DA converter and a combination of the analog reception processing unit and the AD converter at a time of the antenna calibration are the same as in the ordinary wireless communication.

(2) A combination of the analog transmission processing unit and the DA converter and a combination of the analog reception processing unit and the AD converter at the time of the IQ calibration are the same as in the ordinary wireless communication.

(3) The analog transmission processing unit and the analog reception processing unit through which the reference signal passes at the time of the IQ calibration are connected to the same antenna.

SUMMARY OF THE INVENTION

However, a wireless communication device with the combination of the analog transmission processing unit and the DA converter and the combination of the analog reception processing unit and the AD converter fixed, has a difficulty in satisfying all the above mentioned three constraints. For example, when the constraints (1) and (2) are satisfied at the same time, the constraint (3) is not satisfied and when the constraints (1) and (3) are satisfied at the same time, the constraint (2) is not satisfied.

The present invention has been made in view of the above issues, and it is desirable to provide a new and improved signal processor, control method, and wireless communication device which can change the combination of the analog transmission processing unit and the DA converter and the combination of the analog reception processing unit and the AD converter properly.

According to an embodiment of the present invention, there is provided a signal processor, including: a plurality of analog reception processing units; a plurality of AD converters; a plurality of DA converters; and a plurality of analog transmission processing units, wherein the signal processor is connected to a plurality of antennas for transmitting and receiving wireless signals. More specifically, each of the analog reception processing units shifts a frequency band of the wireless signal received through the connected antenna to a low frequency side to generate an analog baseband signal and outputs the analog baseband signal from an output terminal, each of the AD converters converts the analog baseband signal generated by the connected analog reception processing unit into a digital baseband signal and outputs the digital baseband signal, each of the DA converters converts the input digital baseband signal into an analog baseband signal and outputs the analog baseband signal, and each of the analog transmission processing units shifts the frequency band of the analog baseband signal output from the connected DA converter to a high frequency side.

The signal processor further includes a transmission switch which switches among the DA converters connected to the respective analog transmission processing units, and a reception switch which switches among the AD converters connected to the respective analog reception processing units.

In this structure, by providing the transmission switch, the combination of the analog transmission processing unit and the DA converter may be changed, for example, depending on the necessity or the purpose. By providing the receiving switch, the combination of the analog reception processing unit and the AD converter may be changed, for example, depending on the necessity or the purpose.

The signal processor may further include a property calibration unit which calibrates a property of at least one of the analog reception processing unit, the AD converter, the DA converter, the analog transmission processing unit, and the antenna; and a control unit which controls the transmission switch and the reception switch according to a target property to be calibrated by the property calibration unit.

In this structure, since the control unit controls the transmission switch and the reception switch, the combination of the analog reception processing unit, the AD converter, the DA converter, and the analog transmission processing unit may be changed depending on the target property to be calibrated by the property calibration unit.

Further, the signal processor may include a plurality of rectifiers which rectify the signals obtained by shifting the analog baseband signals to the high frequency side by the respective analog transmission processing units and which are arranged so that each outputs the rectified signal from an output terminal of the analog reception processing unit connected to the same antenna as the analog transmission processing unit. In the property calibration of the first analog transmission processing unit and the first DA converter by the property calibration unit, the control unit may connect the first analog transmission processing unit and the first DA converter to the transmission switch and connect the first analog reception processing unit, connected to the same antenna as the first analog transmission processing unit, which outputs the signal rectified by the rectifier from the output terminal and the second AD converter to the reception switch.

Further, in the property calibration of the first analog reception processing unit and the first AD converter by the property calibration unit, the control unit may connect the first analog transmission processing unit and the second DA converter to the transmission switch, and connect the first analog reception processing unit which the signal obtained by shifting the analog baseband signal to the high frequency side by the first analog transmission processing unit inputs and the first AD converter to the reception switch.

Further, in the calibration of the antenna property by the property calibration unit, as a first step, the control unit may connect the first analog transmission processing unit and the first DA converter to the transmission switch and connect the second analog reception processing unit which is connected to the second antenna for receiving the wireless signal from the first antenna connected to the first analog transmission processing unit and the second AD converter to the reception switch.

As a second step, the control unit may connect the second analog transmission processing unit connected to the second antenna and the second DA converter to the transmission switch and connect the first analog reception processing unit which is connected to the first antenna for receiving the wireless signal transmitted from the second antenna and the first AD converter to the reception switch.

The control unit may connect the first analog transmission processing unit and the first DA converter to the transmission switch during the transmission period of the wireless signals from the first antenna to another wireless communication device, and connect the first analog reception processing unit and the first AD converter to the reception switch during the reception period of the wireless signals from another wireless communication device through the first antenna.

As mentioned above, since the control unit controls the transmission switch and the reception switch, the property calibration unit may calibrate the properties of the analog transmission processing unit and the DA converter by the combination of the both in the general wireless communication. The property calibration unit may calibrate the properties of the analog reception processing unit and the AD converter by the combination of them in the general wireless communication. Further, the property calibration unit may calibrate the property of the antenna by the combination of the analog transmission processing unit, the DA converter, and the antenna and the combination of the analog reception processing unit, the AD converter, and the antenna in the general wireless communication.

When a wiring between the first AD converter and the first analog transmission processing unit and a wiring between the first DA converter and the first analog reception processing unit are shared, a connection of the first AD converter and the first analog transmission processing unit and a connection of the first DA converter and the first analog reception processing unit can hardly be established at the same time. In such a case, however, the control unit may control the transmission switch and the reception switch to change the combination of the analog transmission processing unit and the DA converter and the combination of the analog reception processing unit and the AD converter properly, as mentioned above, and hence the property calibration of the respective components is possible by the property calibration unit.

The signal processor may further include a plurality of digital reception processing units which respectively convert the digital baseband signal output from the connected AD converter into a bit string, a plurality of digital transmission processing units which respectively generate the digital baseband signal and output the signal to the connected DA converter, and the switching unit which switches among the digital reception processing units respectively connected to the AD converters and among the digital transmission processing units respectively connected to the DA converters.

According to another embodiment of the present invention, there is provided a control method that is carried out in a signal processor having a plurality of analog reception processing units, AD converters, DA converters, and analog transmission processing units, the signal processor being connected to a plurality of antennas for transmitting and receiving wireless signals, in which each of the analog reception processing units shifts a frequency band of the wireless signal received by the connected antenna to a low frequency side to generate an analog baseband signal and outputs the analog baseband signal from an output terminal, each of the AD converters converts the analog baseband signal generated by the connected analog reception processing unit into a digital baseband signal and outputs the digital baseband signal, each of the DA converters converts the input digital baseband signal into an analog baseband signal and outputs the analog baseband signal, and each of the analog transmission processing units shifts the frequency band of the analog baseband signal output from the connected DA converter to a high frequency side. More specifically, the control method includes a step of switching among the DA converters connected to the respective analog transmission processing units and switching among the AD converters connected to the respective analog reception processing units, depending on a target property for calibration.

According to another embodiment of the present invention, there is provided a wireless communication device having a MIMO communication function, which includes a plurality of antennas; a plurality of analog reception processing units; a plurality of AD converters; a plurality of DA converters; and a plurality of analog transmission processing units. More specifically, each of the analog reception processing units shifts a frequency band of the wireless signal received through the connected antenna to a low frequency side to generate an analog baseband signal and outputs the analog baseband signal from an output terminal, each of the AD converters converts the analog baseband signal generated by the connected analog reception processing unit into a digital baseband signal and outputs the digital baseband signal, each of the DA converters converts the input digital baseband signal into an analog baseband signal and outputs the analog baseband signal, and each of the analog transmission processing units shifts the frequency band of the analog baseband signal output from the connected DA converter to a high frequency side. The wireless communication device further includes a transmission switch which switches among the DA converters respectively connected to the analog transmission processing units, and a reception switch which switches among the AD converters respectively connected to the analog reception processing units.

In this structure, by providing the transmission switch, the combination of the analog transmission processing unit and the DA converter may be changed, for example, depending on the necessity and the purpose. By providing the receiving switch, the combination of the analog reception processing unit and the AD converter may be changed, for example, depending on the necessity and the purpose.

According to the embodiments of the present invention described above, the combination of the analog transmission processing unit and the DA converter and the combination of the analog reception processing unit and the AD converter may be changed properly.

DETAILED DESCRIPTION OF THE PREFERRED EMBODIMENTS

Figure 1:
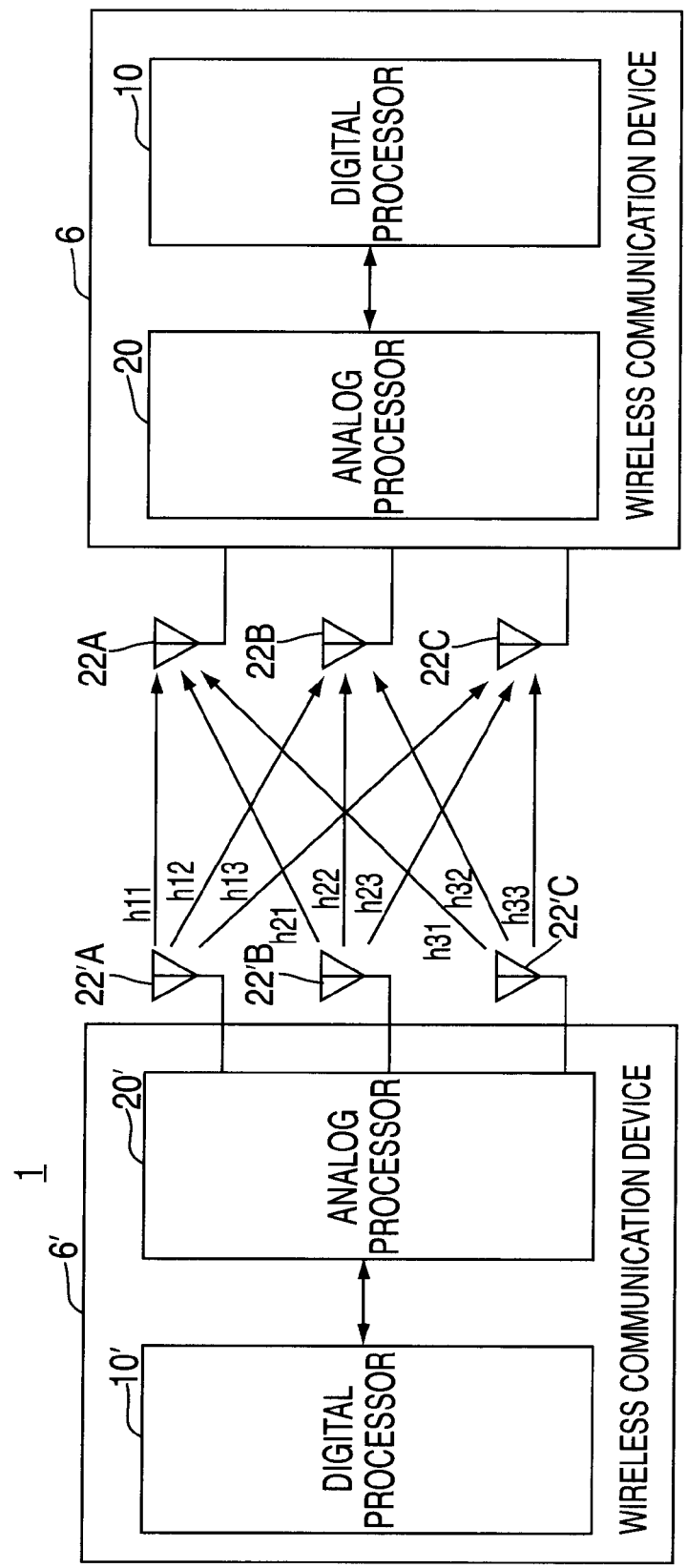
FIG. 1 is an explanatory view showing the structure of a wireless communication system according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

According to the following sequences, "Best Mode for Carrying Out the Invention" will be described.

[1] Outline of Wireless Communication System according to Embodiment

[2] Detailed Description of Wireless Communication Device Forming Wireless Communication System
   [2-1] IQ Calibration
   [2-2] Antenna Calibration
   [2-3] Purpose of Embodiment
   [2-4] State of Switches in Each Operation
   [2-5] Operation of Wireless Communication Device

[3] Conclusion

[1] OUTLINE OF WIRELESS COMMUNICATION SYSTEM ACCORDING TO EMBODIMENT

At first, referring to FIG. 1, the outline about a wireless communication system 1 according to the embodiment will be described.

FIG. 1 is an explanatory view showing the structure of the wireless communication system 1 according to the embodiment. As shown in FIG. 1, the wireless communication system 1 is provided with a wireless communication device 6 and a wireless communication device 6'. Hereinafter, the case where a wireless signal is transmitted from the wireless communication device 6' to the wireless communication device 6 will be described, both the wireless communication device 6 and the wireless communication device 6' may operate as a receiving device and a transmitting device.

The wireless communication device 6' is provided with a digital processor 10', an analog processor 20', and a plurality of antennas 22'A to 22'C.

The digital processor 10' generates a baseband signal from a bit string of transmission data and outputs it as a signal of analog format. While, the analog processor 20' shifts a frequency band of the baseband signal of analog format input from the digital processor 10' into a high frequency side and supplies a high frequency signal with the frequency band shifted to the antennas 22'A to 22'C. Then, each of the antennas 22'A to 22'C transmits a high frequency signal supplied from the analog processor 20' to the wireless communication device 6 as the wireless signal.

The wireless communication device 6 includes a digital processor 10, an analog processor 20, and a plurality of antennas 22A to 22C.

Each of the antennas 22A to 22C receives wireless signals transmitted from the antennas 22'A to 22'C of the wireless communication device 6' and outputs them to the analog processor 20 as a high frequency signal. The analog processor 20 converts the high frequency signals input from each of the antennas 22A to 22C to a baseband signal and outputs them to the digital processor 10 in analog format. The digital processor 10 converts the baseband signal of analog format into that of digital format and separates it into signal sequence transmitted from the antenna 22'A to 22'C, hence to obtain a bit string.

Here, a signal separation method by the digital processor 10 will be briefly described.

A signal transmitted from the antenna 22'A of the wireless communication device 6' is defined as x1, a signal transmitted from the antenna 22'B is defined as x2, and a signal transmitted from the antenna 22'C is defined as x3. Further, a signal received by the antenna 22A of the wireless communication device 6 is defined as r1, a signal received by the antenna 22B is defined as r2, and a signal received by the antenna 22C is defined as r3.

The property of a transmission channel between the antenna 22'A and the antenna 22A is defined as h11, the property of the transmission channel between the antenna 22'A and the antenna 22B is defined as h12, and the property of the transmission channel between the antenna 22'A and the antenna 22C is defined as h13. Further, the property of the transmission channel between the antenna 22'B and the antenna 22A is defined as h21, the property of the transmission channel between the antenna 22'B and the antenna 22B is defined as h22, and the property of the transmission channel between the antenna 22'B and the antenna 22C is defined as h23. Further, the property of the transmission channel between the antenna 22'C and the antenna 22A is defined as h31, the property of the transmission channel between the antenna 22'B and the antenna 22C is defined as h32, and the property of the transmission channel between the antenna 22'C and the antenna 22C is defined as h33. In this case, the relation between the signal transmitted from the wireless communication device 6' and the signal received by the wireless communication device 6 can be expressed as the following formula 1.

$$\frac{Tx(A) \times K(A)}{Rx(A)} = \frac{Tx(A)}{Rx(A)}$$ [Formula 1]

-continued $$\frac{Tx(B) \times K(B)}{Rx(B)} = \frac{Tx(A)}{Rx(A)}$$

$$\frac{Tx(C) \times K(C)}{Rx(C)} = \frac{Tx(A)}{Rx(A)}$$

There is the case where the first term of a right side in the formula 1 is referred to as channel matrix H (transfer function). The channel matrix H can be obtained in the wireless communication device 6 by transmitting a known signal before the wireless communication device 6' transmits x1, x2, and x3.

After the digital processor 10 obtains the channel matrix H, it is assumed by using an inverse matrix of the channel matrix H that the signal transmitted from the antenna 22'A is x1, the signal transmitted from the antenna 22'B is x2, and the signal transmitted from the antenna 22'C is x3.

In this way, the communication system in which the wireless communication device 6 and the wireless communication device 6', provided with a plurality of antennas, transmit and receive a plurality of signal sequences comes under the MIMO (Multiple-Input Multiple-Output) communication system. The MIMO communication system is effective in improving transmission speed in proportion to the number of antennas without extending the frequency band to use.

The wireless communication device 6 and the wireless communication device 6' may be an image processor such as a PC (Personal Computer), a domestic image processor (DVD recorder and video deck), a cell phone, a PHS (Personal Handyphone System), a portable music player, a portable image processor, a PDA (Personal Digital Assistant), a domestic game device, a portable game device, and a household electric apparatus.

[2] DETAILED DESCRIPTION OF WIRELESS COMMUNICATION DEVICE FORMING WIRELESS COMMUNICATION SYSTEM

In the above description, the outline of the wireless communication system 1 according to the embodiment has been described referring to FIG. 1. Next, the wireless communication device 6 forming the wireless communication system 1 will be described in detail, referring to FIG. 2 to FIG. 21.

Figure 2:
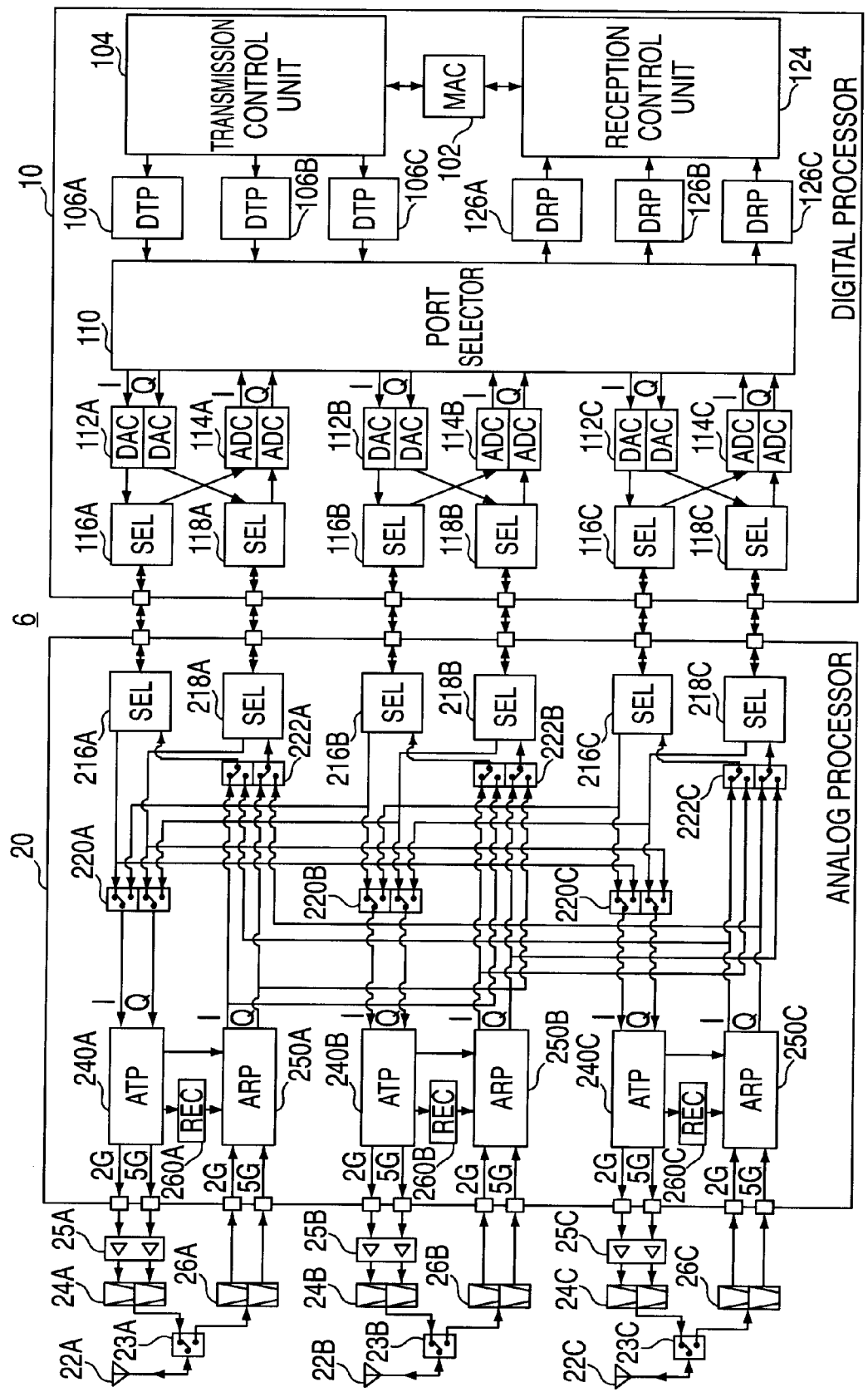
FIG. 2 is a functional block diagram showing the structure of the wireless communication device according to the embodiment.

FIG. 2 is a functional block diagram showing the structure of the wireless communication device 6 according to the embodiment. As shown in FIG. 2, the wireless communication device 6 is provided with a plurality of antennas 22A to 22C, switches 23A to 23C, a plurality of filters 24A to 24C and 26A to 26C, a plurality of power amplifiers 25A to 25C, the digital processor 10, and the analog processor 20. Each component with a different alphabet attached after the same reference numeral (for example, the antenna 22A and the antenna 22B) is practically identical in the function and only the reference numeral is used unless they need to be distinguished (for example, the antenna 22).

The digital processor 10 includes a MAC processing unit 102, a transmission control unit 104, a plurality of digital transmission processing units 106A to 106C, a port selector 110, a plurality of DACs 112A to 112C, a plurality of ADCs 114A to 114C, a plurality of shared selectors 116A to 116C and 118A to 118C, a reception control unit 124, and a plurality of digital reception processing units 126A to 126C.

The MAC processing unit 102 generates a bit string of any frame including various data to be transmitted from the wireless communication device 6 and outputs it to the transmission control unit 104. Various data includes music data such as music, lecture, and radio program, image data such as movie, television program, video program, photograph, document, picture, and diagram, and optional data such as game and software. The frame includes a frame for communication management such as a beacon frame, a RTS (request to send) frame, and a CTS (clear to send) frame, in addition to a data frame.

The transmission control unit 104 separates the bit string input from the MAC processing unit 102 into three signal sequences. The transmission control unit 104 according to the embodiment has a function as a control unit for controlling the transmission switches 220A to 220C as described later and a function as a property calibration unit for performing various calibrations.

The digital transmission processing units 106A to 106C respectively receive one of the signal sequences separated by the transmission control unit 104 input in there converts or modulates the received signal sequence into the baseband signal. For example, the digital transmission processing units 106A to 106C may use an OFDM (Orthogonal Frequency Division Multiplexing) modulation method.

The port selector 110 connects each of the digital transmission processing units 106A to 106C to one of the DACs 112A to 112C and connects each of the digital reception processing units 126A to 126C to one of the ADCs 114A to 114C. Further, the port selector 110 can change the combination of the digital transmission processing units 106A to 106C and the DACs 112A to 112C and the combination of the digital reception processing units 126A to 126C and the ADCs 114A to 114C and it has a function as a switching unit.

The baseband signal of digital format of the I-channel and the Q-channel is input to the DACs 112A to 112C and the DACs work as a DA converter for converting the input baseband signal into a signal of analog format. In addition, the baseband signal of analog format of the I-channel and the Q-channel is input to the ADCs 114A to 114C and the ADCs work as an AD converter for converting the input baseband signal into a signal of digital format.

The digital reception processing units 126A to 126C receives the baseband signals of digital format from the ADCs 114A to 114C and they respectively perform, for example, the fast Fourier transformation on the baseband signals and output them to the reception control unit 124.

The reception control unit 124 has a function as a spatial signal separator, separating the wireless signals multiplexed spatially from the signals input from the digital reception processing units 126A to 126C by using the channel matrix H shown in the formula 1 and converting the signals into a bit string and outputting it to the MAC processing unit 124. The reception control unit 124 has a function as a controller for controlling the reception switches 222A to 222C described liter and a function as the property calibration unit for performing various calibrations.

The shared selectors 116A to 116C transmit and receive the baseband signals of the I-channel between the digital processor 10 and the analog processor 20. The shared selectors 118A to 118C transmit and receive the baseband signals of the Q-channel between the digital processor 10 and the analog processor 20. By providing the shared selectors 116A to 116C and the shared selectors 118A to 118C, a path for transmission and reception of the I-channel and the Q-channel between the digital processor 10 and the analog processor 20 gets in common. As the result, the number of the pins for input and output of the baseband signals, which are provided in both the digital processor 10 and the analog processor 20, can be reduced.

The analog processor 20 includes a plurality of shared selectors 216A to 216C and the shared selectors 218A to 218C, a plurality of transmission switches 220A to 220C, a plurality of reception switches 222A to 222C, a plurality of analog transmission processing units 240A to 240C, a plurality of analog reception processing units 250A to 250C, and a plurality of rectifiers 260A to 260C.

At a time of transmitting the wireless signals from the wireless communication device 6, the shared selectors 216A to 216C receive the baseband signals of the I-channel from the shared selectors 116A to 116C and output them to the connected transmission switches 220A to 220C. Specifically, the shared selector 216A is connected to the transmission switch 220A and the transmission switch 220C, the shared selector 216B is connected to the transmission switch 220A and the transmission switch 220B, and the shared selector 216C is connected to the transmission switch 220B and the transmission switch 220C.

At a time of receiving the wireless signals by the wireless communication device 6, the shared selectors 216A to 216C receive the baseband signals of the I-channel from the connected reception switches 222A to 222C and transmit them to the shared selectors 116A to 116C. Specifically, the shared selector 216A is connected to the reception switch 222A, the shared selector 216B is connected to the reception switch 222B, and the shared selector 216C is connected to the reception switch 222C.

At a time of transmitting the wireless signals from the wireless communication device 6, the shared selectors 218A to 218C receive the baseband signals of the Q-channel from the shared selectors 118A to 118C and output them to the connected transmission switches 220A to 220C. Specifically, the shared selector 218A is connected to the transmission switch 220A and the transmission switch 220C, the shared selector 218B is connected to the transmission switch 220A and the transmission switch 220B, and the shared selector 218C is connected to the transmission switch 220B and the transmission switch 220C.

At a time of receiving the wireless signals by the wireless communication device 6, the shared selectors 218A to 218C receive the baseband signals of the Q-channel from the connected reception switches 222A to 222C and transmit them to the shared selectors 118A to 118C. Specifically, the shared selector 218A is connected to the reception switch 222A, the shared selector 218B is connected to the reception switch 222B, and the shared selector 218C is connected to the reception switch 222C.

By providing the shared selectors 216A to 216C, 218A to 218C, 116A to 116C, and 118A to 118C, a path for transmission and reception of the I-channel and the Q-channel between the digital processor 10 and the analog processor 20 gets in common. As the result, the number of pins for input and output of the baseband signals, which are provided in both the digital processor 10 and the analog processor 20, can be reduced.

The respective transmission switches 220A to 220C connect the respective analog transmission processing units 240A to 240C to some of the shared selectors 216A to 216C and some of the shared selectors 218A to 218C. The respective reception switches 222A to 222C connect the respective shared selectors 216A to 216C and the respective shared selectors 218A to 218C to some of the analog reception processing units 250A to 250C.

The detailed description will be described later in "[2-4] State of Switches in Each Operation" and the transmission switches 220A to 220C (transmission switching units) and the reception switches 222A to 222C (reception switching units) can be switched depending on the operation of the wireless communication device 6.

Figure 3:
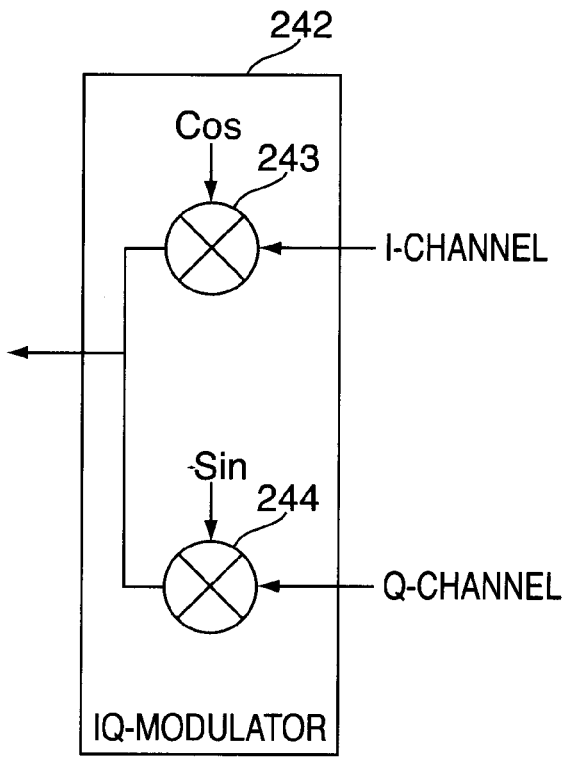
FIG. 3 is an explanatory view showing a structure example of an IQ modulator.

As shown in FIG. 3, each of the analog transmission processing units 240A to 240C is provided with an IQ modulator 242 (A to C) for converting the input baseband signals of the I-channel and the Q-channel into high frequency signals. Each of the analog reception processing units 250A to 250C is provided with an IQ demodulator 252 for converting the input high frequency signals into the baseband signals of the I-channel and the Q-channel as shown in FIG. 4.

FIG. 3 is an explanatory view showing a structure example of the IQ modulator 242. As shown in FIG. 3, the IQ modulator 242 has multipliers 243 and 244. The multiplier 243 multiplies the input baseband signal of the I-channel by the Cos wave and the multiplier 244 multiplies the input baseband signal of the Q-channel by the −Sin wave. Then, the IQ modulator 242 multiplexes the multiplication result obtained by the multiplier 243 and the multiplier 244 and outputs it as the high frequency signal. The high frequency signal is not limited to the 2 GHz band and the 5 GHz band as shown in FIG. 2 but may be any frequency band.

Figure 4:
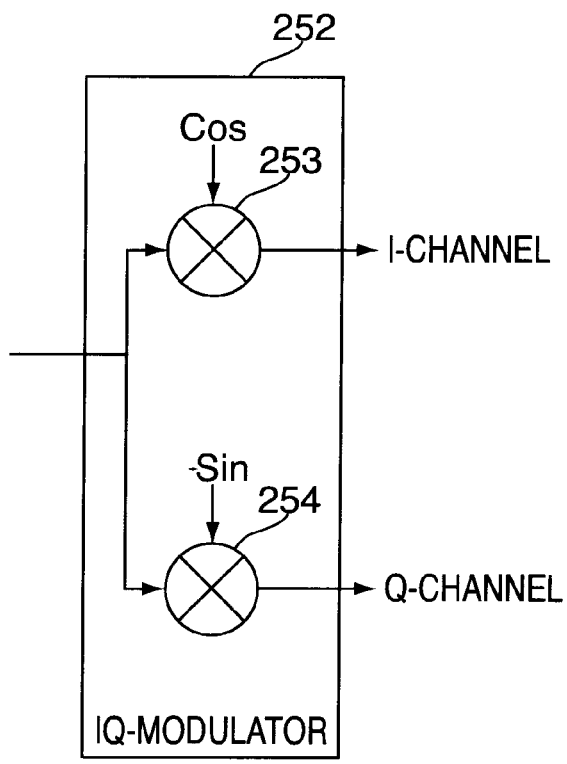
FIG. 4 is the explanatory view showing a structure example of an IQ demodulator.

FIG. 4 is an explanatory view showing a structure example of the IQ demodulator 252. As shown in FIG. 4, the IQ demodulator 252 has a multiplier 253 and a multiplier 254. The multiplier 253 multiplies the input high frequency signal by the Cos wave, generates a baseband signal of the I-channel, and outputs it (down conversion). The multiplier 254 multiplies the input high frequency signal by the −Sin wave, generates a baseband signal of the Q-channel, and outputs it. The function of the rectifiers 260A to 260C will be described in the following description "[2-1] IQ Calibration".

The analog transmission processing units 240A to 240C and the analog reception processing units 250A to 250C are respectively connected to some of the antennas 22A to 22C. The analog processor 20 and the digital processor 10 can be manufactured as an IC chip and have a function as a signal processor.

[2-1] IQ Calibration

As mentioned above, the wireless communication device 6 according to the embodiment is provided with the IQ modulator 242 and the IQ demodulator 252. Here, when the Cos wave and the −Sin wave multiplied in the IQ modulator 242 and the IQ demodulator 252 have the same amplitude and a phase difference of 90 degrees, a normal signal can be obtained as shown in FIG. 5.

Figure 5:
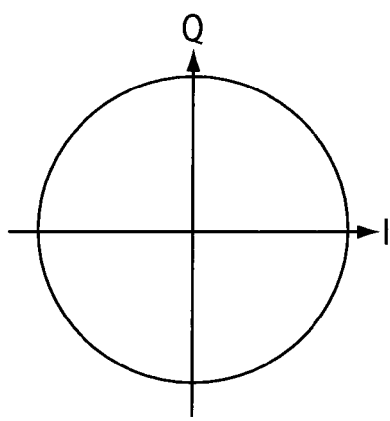
FIG. 5 is an explanatory view showing an I-channel and a Q-channel expected when a Cos wave and a −Sin wave are normal.

FIG. 5 is an explanatory view showing the I-channel and the Q-channel expected in the case where the Cos wave and the −Sin wave are normal. As shown in FIG. 5, when the Cos wave and the −Sin wave that are the sine wave are normal, the values which could be obtained by the I-channel and the Q-channel are assumed on a circle with an original point centered on the IQ flat surface.

On the other hand, an amplitude error, for example, shown in FIG. 5 occurs mainly because the amplitude of the sine wave to be given to the IQ modulator 242 is different from that to be given to the IQ demodulator 252 and because of imbalance between the I-channel and the Q-channel of the ADC 114 and/or the DAC 112.

Figure 6:
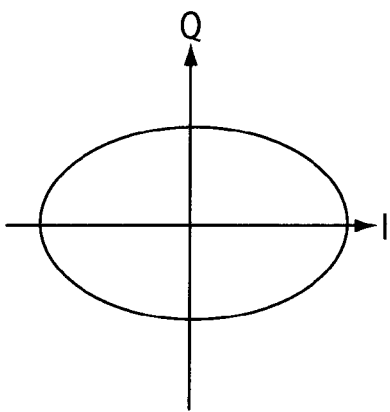
FIG. 6 is an explanatory view showing the case where an amplitude error occurs.

FIG. 6 is an explanatory view showing the case of the amplitude error occurring. As shown in FIG. 6, when the amplitude of the sine wave to be given to the IQ modulator 242 is different from that to be given to the IQ demodulator 252 and there is an imbalance between the I-channel and the Q-channel of the ADC 114 and/or the DAC 112, distortion occurs on the IQ flat surface. More specifically, FIG. 6 shows the amplitude error in the case where the amplitude of the Q-channel becomes smaller.

Further, when the sine wave supplied to the IQ modulator 242 is not orthogonal to that one supplied to the IQ demodulator 252, there occurs a phase error, for example, as shown in FIG. 6.

Figure 7:
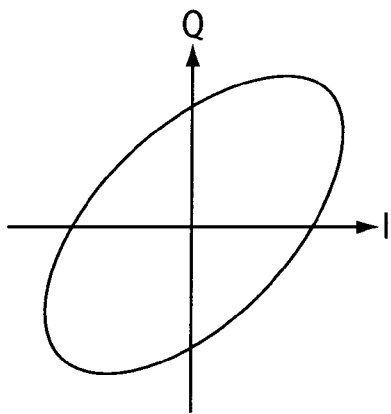
FIG. 7 is an explanatory view showing the case where a phase error occurs.

FIG. 7 is an explanatory view showing the case of the phase error occurring. As shown in FIG. 7, when the sine wave supplied to the IQ modulator 242 is not orthogonal to that one supplied to the IQ demodulator 252, the normal I-channel and Q-channel can hardly be obtained.

In this way, when there is an IQ imbalance such as an amplitude error and a phase error in the sine wave, the transmission signal and the reception signal are distorted and the signal components are deteriorated.

Before starting the wireless communication after turning on the power source, the wireless communication device 6 performs the IQ calibration for calibrating the amplitude error and the phase error of the sine wave. Hereinafter, referring to FIG. 8, the IQ calibration will be described.

Figure 8:
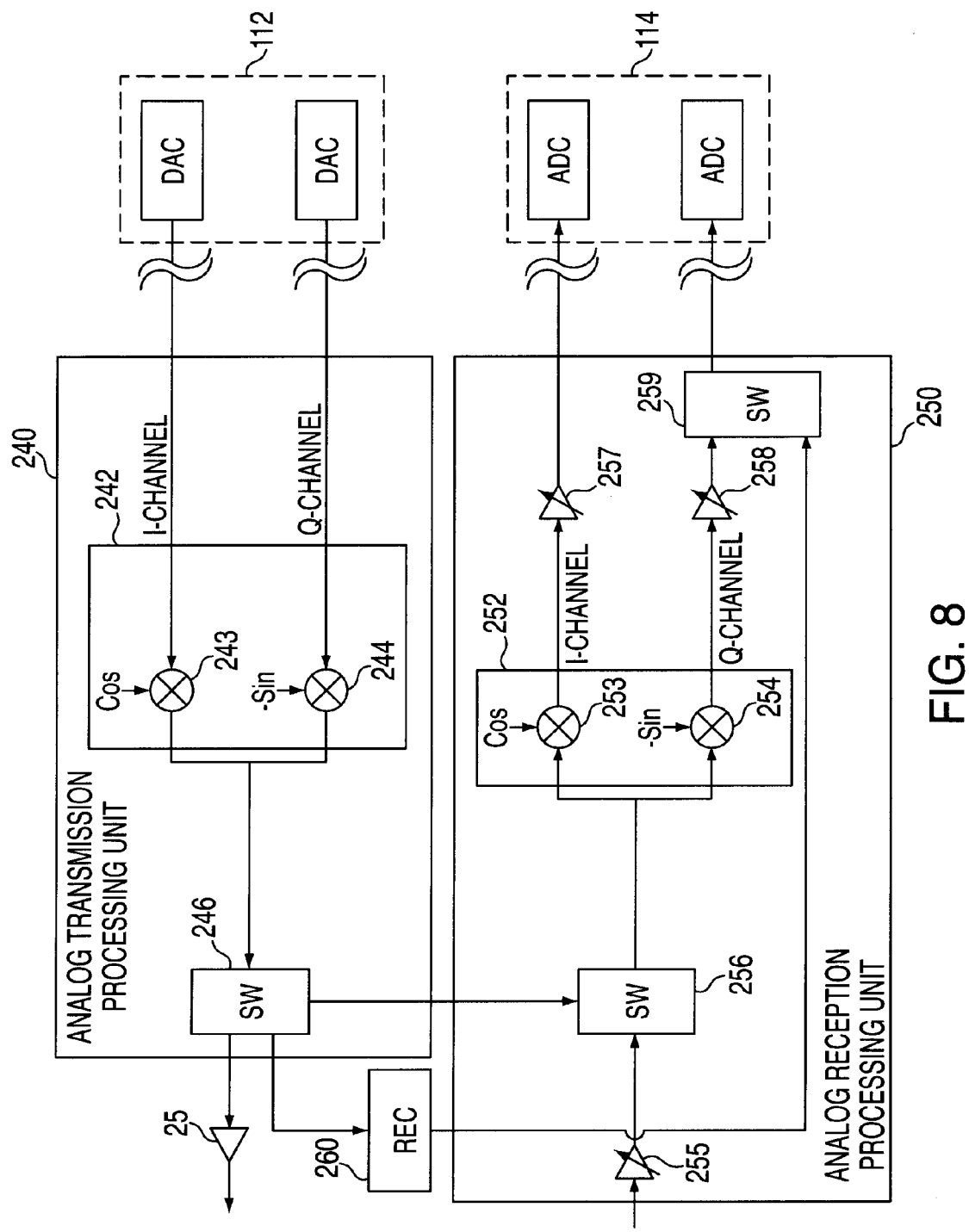
FIG. 8 is an explanatory view showing the structure of an analog transmission processing unit and an analog reception processing unit.

FIG. 8 is an explanatory view showing the structure of an analog transmission processing unit 240 and an analog reception processing unit 250. As shown in FIG. 8, the analog transmission processing unit 240 includes the IQ modulator 242 and the switch 246 and the analog reception processing unit 250 includes the IQ demodulator 252, an LNA (Low Noise Amp) 255, switches 256 and 259, and VGAs 257 and 258.

The IQ calibration is separated into the IQ calibration on a transmitting side and the IQ calibration on a receiving side. The IQ calibration on the transmitting side mainly aims at the calibration of the DAC 112 and the analog transmission processing unit 240. In the IQ calibration on the transmitting side, the IQ modulator 242 is connected to the rectifier 260 through the switch 246 and the rectifier 260 is connected to the ADC 114 through the switch 259.

As the result, when a reference signal is input from the DAC 112 to the IQ modulator 242, the reference signal frequency-converted by the IQ modulator 242 is input to the rectifier 260. The rectifier 260 rectifies the input reference signal, in other words, it changes the signal value to an absolute value and returns it back to the transmission control unit 104 through the ADC 114.

Through the observation of the returned signal, the transmission control unit 104 obtains a correction coefficient for correcting the IQ amplitude error and the IQ phase error on the transmitting side and it is used in the digital processor 10, thereby realizing the transmission performance equivalently without the IQ imbalance.

On the other hands, the IQ calibration on the receiving side mainly aims at the calibration of the IQ demodulator 252 and the ADC 114. In the IQ calibration on the receiving side, the IQ modulator 242 is connected to the IQ demodulator 252 through the switch 246 and the switch 256, and the IQ demodulator 252 is connected to the ADC 114 through the switch 259.

As the result, when a reference signal is input from the DAC 112 to the IQ modulator 242, the reference signal frequency-converted by the IQ modulator 242 is input to the IQ demodulator 252. The IQ demodulator 252 down-converts the input signal and returns it back to the reception control unit 124 through the VGAs (Variable Gain Amplifiers) 257 and 258 and the ADC 114.

Here, since the IQ imbalance on the transmitting side has been already corrected, only the influence of the IQ imbalance on the receiving side can be observed from the returned signal. The reception control unit 124 can estimate an IQ amplitude error and an IQ phase error on the receiving side from the returned signal and obtain a correction coefficient corresponding to the error.

[2-2] Antenna Calibration

Next, the antenna calibration will be described referring to FIG. 9 and FIG. 10.

As mentioned above, the MIMO communication system is the technique for multiplexing a plurality of streams (signal sequences) spatially, transmitting them from a plurality of antennas, and separating the received signals on the receiving side into streams through the signal processing.

A method for transmitting the streams with a weight coefficient on the transmitting side can be applied to the MIMO communication system. It is known that, by using the weight coefficient on the transmitting side, optimum space multiplex and space separation can be performed on both the transmitting side and the receiving side.

The weight coefficient used on the transmitting side is required by getting the situation of the space channel from a channel estimation signal (reference signal) transmitted from the receiving side and calculating a weight coefficient for transmission according to the situation of the space channel. A calculation method of the above mentioned weight coefficient makes use of the fact that a space channel has the reversibility. In other words, the method uses the fact that the space channel in the direction from the wireless communication device 6' to the wireless communication device 6 and the space channel in the direction from the wireless communication device 6 to the wireless communication device 6' are the same.

However, there is an imbalance (branch imbalance) of the transfer functions in the respective components (RF circuit such as the antenna 22 and the filter 24), which is caused by ununiformity in manufacturing them, in the wireless communication device 6 and the wireless communication device 6'. Even if there exists reversibility in the space channels, when there is such a branch imbalance, it becomes different to calculate a weight coefficient correctly on the transmitting side.

Then, after the IQ calibration before starting the wireless communication, the wireless communication device 6 performs the antenna calibration (branch calibration) in order to resolve the branch imbalance. In other words, the antenna calibration is a technique for maintaining the reversibility of the space channel obtained in the digital processor 10 and generating a weight coefficient from the channel estimation signal transmitted from a communication partner (for example, the wireless communication device 6') by correcting the branch imbalance.

When the antenna calibration is not performed, the wireless communication device 6 transmits the channel estimation signal and the wireless communication device 6' obtains a weight coefficient for the wireless communication device 6 based on the space channel information obtained from the channel estimation signal. Then, the wireless communication device 6' transmits the obtained weight coefficient to the wireless communication device 6 and the wireless communication device 6 transmits the data using the received weight coefficient. In this way, when the antenna calibration is not performed, throughput is remarkably reduced by transmission of the weight coefficient. Therefore, the antenna calibration is important which makes it possible to obtain the weight coefficient to be used in the wireless communication device 6 (transmitting side) from the channel estimation signal supplied from the wireless communication device 6' (receiving side).

Hereinafter, a specific example of the antenna calibration will be described. The antenna calibration includes the first step and the second step.

Figure 9:
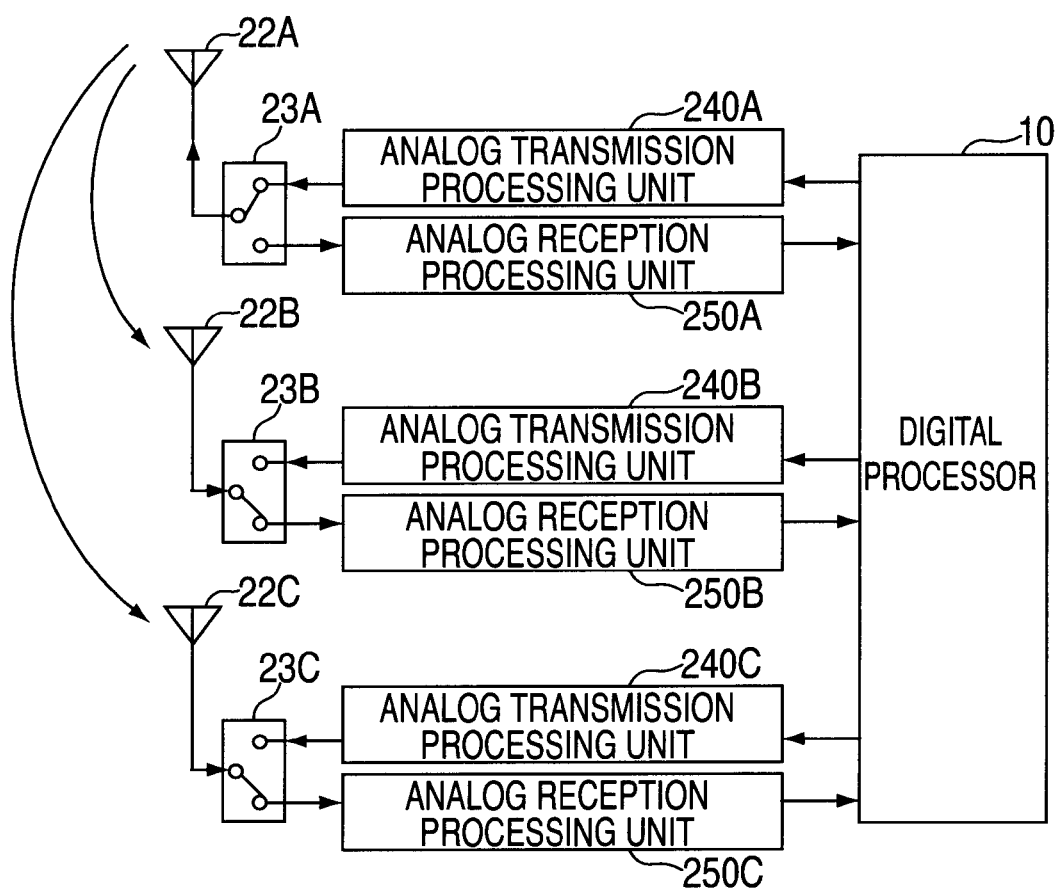
FIG. 9 is an explanatory view showing a first step of antenna calibration.

FIG. 9 is an explanatory view showing the first step of the antenna calibration. In the first step of the antenna calibration, as shown in FIG. 9, the antenna 22A is connected to the analog transmission processing unit 240A through the switch 23A, the antenna 22B is connected to the analog reception processing unit 250B through the switch 23B, and the antenna 22C is connected to the analog reception processing unit 250C through the switch 23C. Switching of the switch 23A to switch 23C may be instructed, for example, the digital processor 10.

As the result, in the first step of the antenna calibration, the antenna 22B and the antenna 22C receive a reference signal transmitted from the antenna 22A. Then, the digital processor 10 maintains the signal received through the antenna 22B and the antenna 22C.

Figure 10:
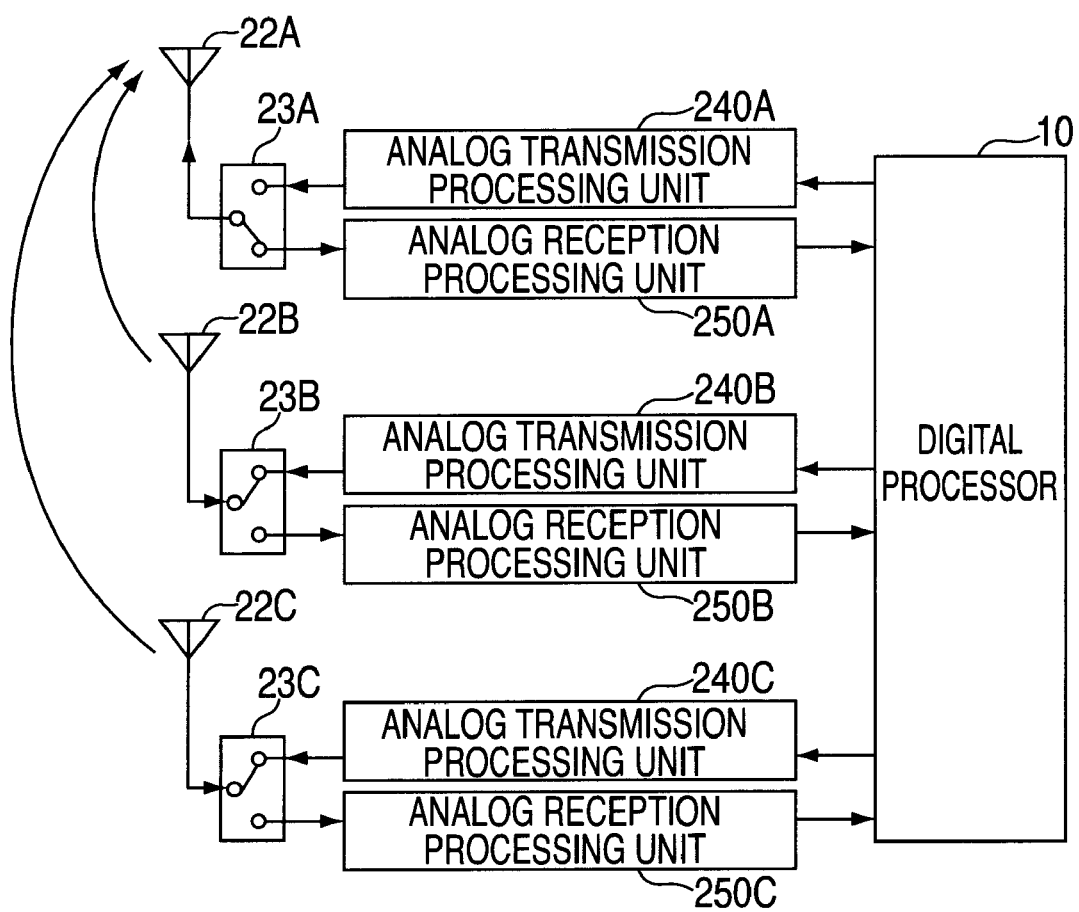
FIG. 10 is an explanatory view showing a second step of the antenna calibration.

FIG. 10 is an explanatory view showing the second step of the antenna calibration. As shown in FIG. 10, the antenna 22A is connected to the analog transmission processing unit 240A through the switch 23A, the antenna 22B is connected to the analog transmission processing unit 250B through the switch 23B, and the antenna 22C is connected to the analog transmission processing unit 250C through the switch 23C.

As the result, in the second step of the antenna calibration, the antenna 22A receives the reference signal transmitted from the antenna 22B and the antenna 22C. Then, the digital processor 10 maintains the signal received through the antenna 22A. Feedback of the reference signal is not performed through the antenna but inside the wireless communication device 6.

Therefore, the digital processor 10 calculates an antenna calibration coefficient for correcting the branch imbalance by using a loopback transfer function of each processing group (the combination of the antenna 22, the analog transmission processing unit 240, and the analog reception processing unit 250) obtained in the first step and the second step.

Here, a transfer coefficient of the processing group in the top stage on the transmitting side shown in FIG. 10 is defined as Tx (A), a transfer coefficient of the processing group in the middle stage is defined as Tx (B), and a transfer coefficient of the processing group in the lowest stage is defined as Tx (C). A transfer coefficient of the processing group in the top stage on the receiving side shown in FIG. 10 is defined as Rx (A), a transfer coefficient of the processing group of the middle stage is defined as Rx (B), and a transfer coefficient of the processing group in the lowest stage is defined as Rx (C). In this case, the antenna calibration aims to require such a correction coefficient K that satisfies the following formula 2.

$$\frac{Tx(A) \times K(A)}{Rx(A)} = \frac{Tx(B) \times K(B)}{Rx(B)} \qquad \text{[Formula 2]}$$
$$= \frac{Tx(C) \times K(C)}{Rx(C)}$$

Hereinafter, a method for requiring the correction coefficient K by using the loopback transfer function (feedback signal) of each processing group obtained in the first step and the second step will be described. Hereinafter, the loopback transfer function obtained through the processing group i on the transmitting side and the processing group j on the receiving side is defined as D (i, j). In this case, the loopback transfer function D (i, j) obtained in the first step and the second step is expressed as the following formula 3.

$$D(A,B)=Tx(A) \times Rx(B)$$
$$D(A,C)=Tx(A) \times Rx(C)$$
$$D(B,A)=Tx(B) \times Rx(A)$$
$$D(C,A)=Tx(C) \times Rx(A) \quad \text{[Formula 3]}$$

Here, when the correction coefficient K (A) is defined as a reference value "1.0", the correction coefficient K (A to C) is shown as the following formula 4.

$$K(A) = 1.0 \quad \text{[Formula 4]}$$
$$K(B) = \frac{D(A, B)}{D(B, A)}$$
$$= \frac{Rx(B)}{Tx(B)} \times \frac{Tx(A)}{Rx(A)}$$
$$K(C) = \frac{D(A, C)}{D(C, A)}$$
$$= \frac{Rx(C)}{Tx(C)} \times \frac{Tx(A)}{Rx(A)}$$

When each correction coefficient shown in the formula 4 is substituted into the formula 2 to check the formula 4, the purpose of the antenna calibration that the value of each term in the formula 2 is constant can be achieved, as shown in the following formula 5. In other words, in the antenna calibration, for example, the transmission control unit 104 and the reception control unit 124 of the digital processor 10 calculate each correction coefficient K according to the formula 4.

$$\frac{Tx(A) \times K(A)}{Rx(A)} = \frac{Tx(A)}{Rx(A)} \quad \text{[Formula 5]}$$
$$\frac{Tx(B) \times K(B)}{Rx(B)} = \frac{Tx(A)}{Rx(A)}$$
$$\frac{Tx(C) \times K(C)}{Rx(C)} = \frac{Tx(A)}{Rx(A)}$$

[2-3] Purpose of Embodiment

As shown in FIG. 2, the input and output pins for connecting the analog processor 20 to the digital processor 10 in the wireless communication device 6 according to the embodiment are shared in the transmission mode and the reception mode from the viewpoint of cost reduction. Since the wireless communication device 6 doesn't perform the transmission and the reception generally at the same, there occurs no issue even when a path used in common between a transmission signal and a reception signal. Although there are three groups respectively in the transmission signal and the reception signal, a path of each transmission signal may be shared with a path of any reception signal.

The IQ calibration and the antenna calibration in the wireless communication device 6 can be realized by resolving the following constraints.

(1) A combination of the analog transmission processing unit 240 and the DAC 112 and a combination of the analog reception processing unit 250 and the ADC 114 in the antenna calibration are the same as in the general wireless communication.

(2) A combination of the analog transmission processing unit 240 and the DAC 112 and a combination of the analog reception processing unit 250 and the ADC 114 in the IQ calibration are the same as in the general wireless communication.

(3) A analog transmission processing unit 240 and the analog reception processing unit 250 which a reference signal passes through in the IQ calibration are connected to the same antenna 22.

Hereinafter, the grounds of the above mentioned constraints will be described.

The antenna calibration aims to correct the imbalance of the transfer functions of the respective processing groups on the transmitting side and the respective processing groups on the receiving side. For example, the DAC 112 and the ADC 114 have a large influence on the branch imbalance. Therefore, when the combination of the analog transmission processing unit 240 and the DAC 112 and the combination of the analog reception processing unit 250 and the ADC 114 are different between the ordinary wireless communication and the antenna calibration, it is difficult to obtain a meaningful correction coefficient K. Because of the above mentioned reason, there is the constraint (1).

At a time of the IQ calibration, especially, the amplitude error occurs by the effect of the DAC 112 and the ADC 114. Therefore, when the combination of the analog transmission processing unit 240 and the DAC 112 and the combination of the analog reception processing unit 250 and the ADC 114 are different between the ordinary wireless communication and the IQ calibration, it is difficult to obtain a significant IQ calibration coefficient. Because of the above mentioned reason, there exists the constraint (2).

It is difficult to return a reference signal in the isolation between the analog transmission processing unit 240 and the analog reception processing unit 250 connected to the different antenna 22 at a time of the IQ calibration. Because of the above mentioned reason, there exists the constraint (3).

In the wireless communication device 6 sharing a path for transmission signal and reception signal as shown in FIG. 2, when the combination of the analog transmission processing unit 240 and the DAC 112 and the combination of the analog reception processing unit 250 and the ADC 114 are fixed, the IQ calibration and the antenna calibration can hardly be performed with the above constraint satisfied.

For example, when the connection of the analog transmission processing unit 240A and the DAC 112A and the connection of the analog reception processing unit 250B and the ADC 114B are fixed and a reference signal is returned from the analog transmission processing unit 240A to the analog reception processing unit 250B at a time of the IQ calibration, the constraint (1) and the constraint (2) can be satisfied. In this case, however, the constraint (3) is not satisfied. In this way, there is such an issue that when the constraints (1) and (2) are satisfied at the same time, the constraint (3) is not satisfied and when the constraints (1) and (3) are satisfied, the constraint (2) is not satisfied.

In view of the above circumstances, the inventors come to manufacture the wireless communication device 6 according to the embodiment. According to the wireless communication device 6, owing to the functions of the transmission switches 220A to 220C and the reception switches 222A to 222C, the combination of the analog transmission processing unit 240 and the DAC 112 and the combination of the analog reception processing unit 250 and the ADC 114 can be changed properly. As the result, it is possible to perform the IQ calibration and the antenna calibration with the constraints satisfied. Hereinafter, referring to FIG. 11 to FIG. 20, the state of the transmission switches 220A to 220C and the reception switches 222A to 222C and the signal paths will be described in each operation of the wireless communication device 6.

[2-4] State of Switches in Each Operation (At a Time of General Wireless Signal Transmission)

Figure 11:
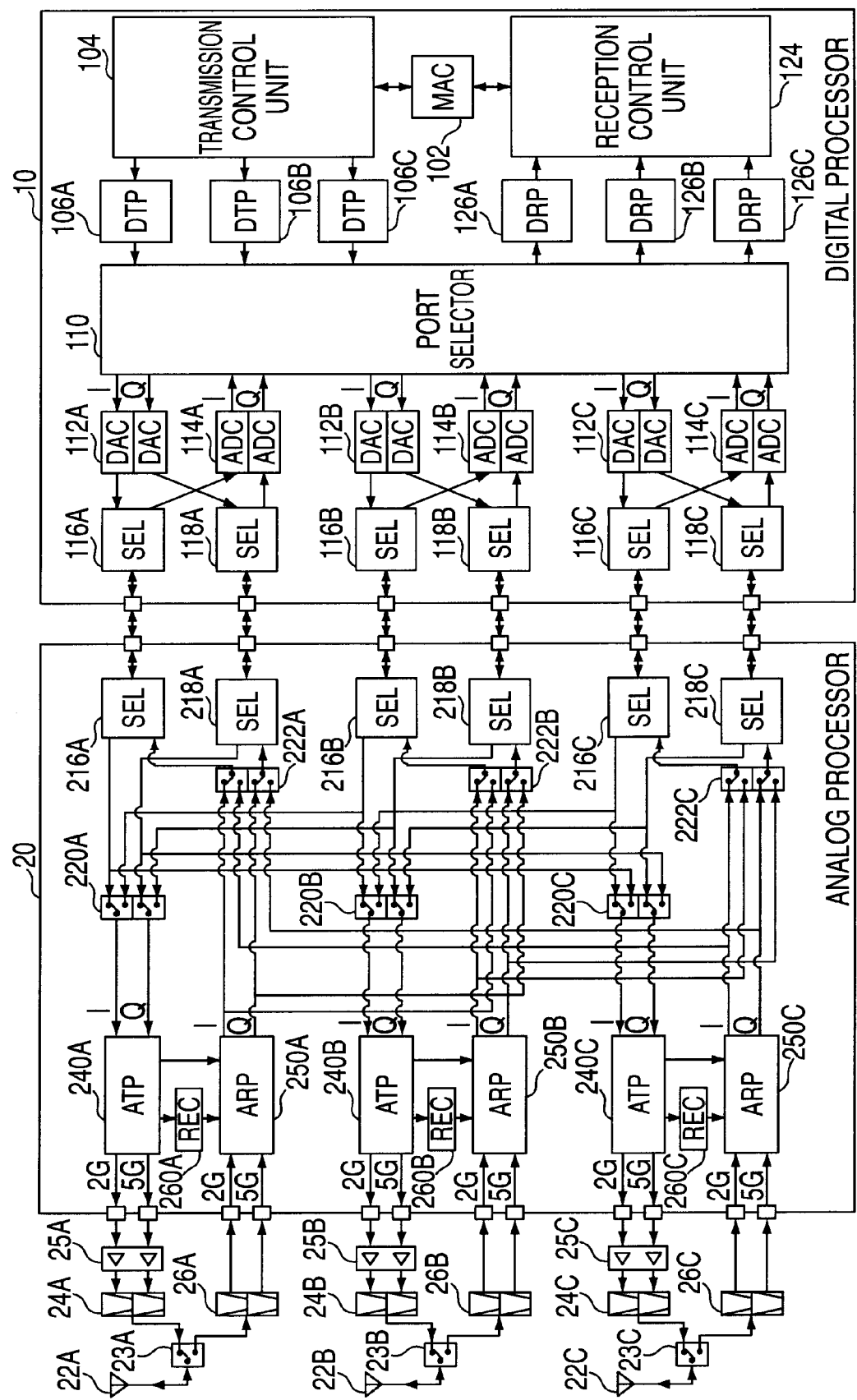
FIG. 11 is an explanatory view showing the state of switches in the wireless communication device at a time of normal wireless signal transmission.

FIG. 11 is an explanatory view showing a switch state of the wireless communication device 6 at a time of the general wireless signal transmission. In FIG. 11, a flow path of the signal is shown in a solid line and the other is shown in a broken line. It is true also in FIG. 12 to FIG. 20.

As shown in FIG. 11, at a time of the general wireless signal transmission, the transmission switch 220A connects the analog transmission processing unit 240A (for example, the first analog transmission processing unit) to the DAC 112A (for example, the first DA converter). The transmission switch 220B connects the analog transmission processing unit 240B (for example, the second analog transmission processing unit) to the DAC 112B (for example, the second DA converter). Further, the transmission switch 220C connects the analog transmission processing unit 240C to the DAC 112C.

As the result, the wireless signal is transmitted from the antenna 22A through the DAC 112A and the analog transmission processing unit 240A and it is transmitted from the antenna 22B through the DAC 112B and the analog transmission processing unit 240B. Further, the wireless signal is transmitted from the antenna 22C through the DAC 112C and the analog transmission processing unit 240C. The state of the transmission switch 220 may be switched by the transmission control unit 104.

(At a Time of General Wireless Signal Reception)

Figure 12:
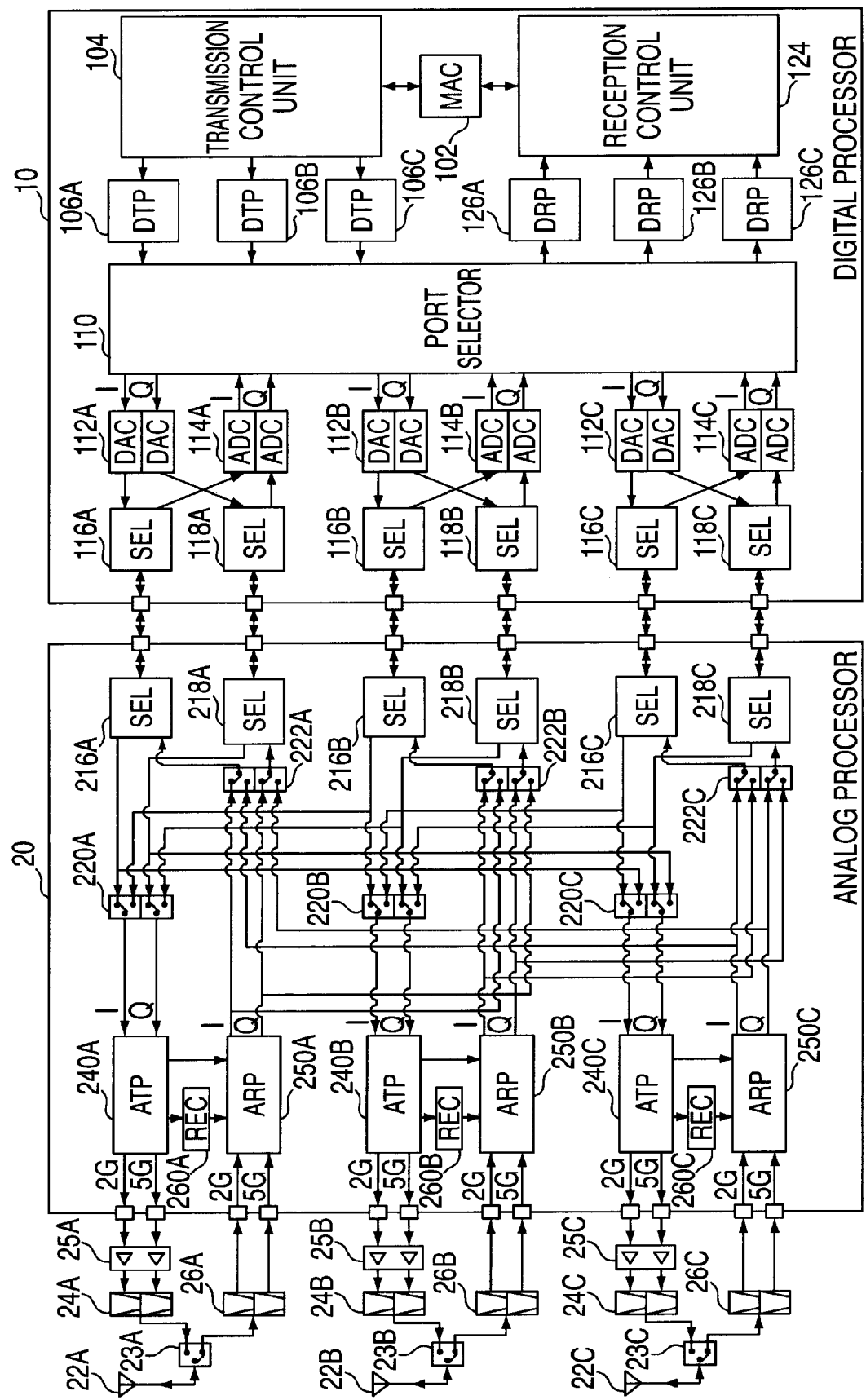
FIG. 12 is an explanatory view showing the state of switches in the wireless communication device at a time of normal wireless signal reception.

FIG. 12 is an explanatory view showing a switch state of the wireless communication device 6 at a time of the general wireless signal reception.

As shown in FIG. 12, at a time of the general wireless signal reception, the reception switch 222A connects the analog reception processing unit 250A (for example, the first analog reception processing unit) to the ADC 114A (for example, the first AD converter). The reception switch 222B connects the analog reception processing unit 250B (for example, the second analog reception processing unit) to the ADC 114B (for example, the second AD converter). Further, the reception switch 222C connects the analog reception processing unit 250C to the ADC 114C.

Accordingly, the wireless signal received by the antenna 22A arrives at the ADC 114A through the analog reception processing unit 250A and the wireless signal received through the antenna 22B arrives at the ADC 114B through the analog reception processing unit 250B. Further, the wireless signal received through the antenna 22C arrives at the ADC 114C through the analog reception processing unit 250C. The state of the reception switch 222 may be switched by the reception control unit 124.

(At a Time of the IQ Calibration on the Transmitting Side)

Figure 13:
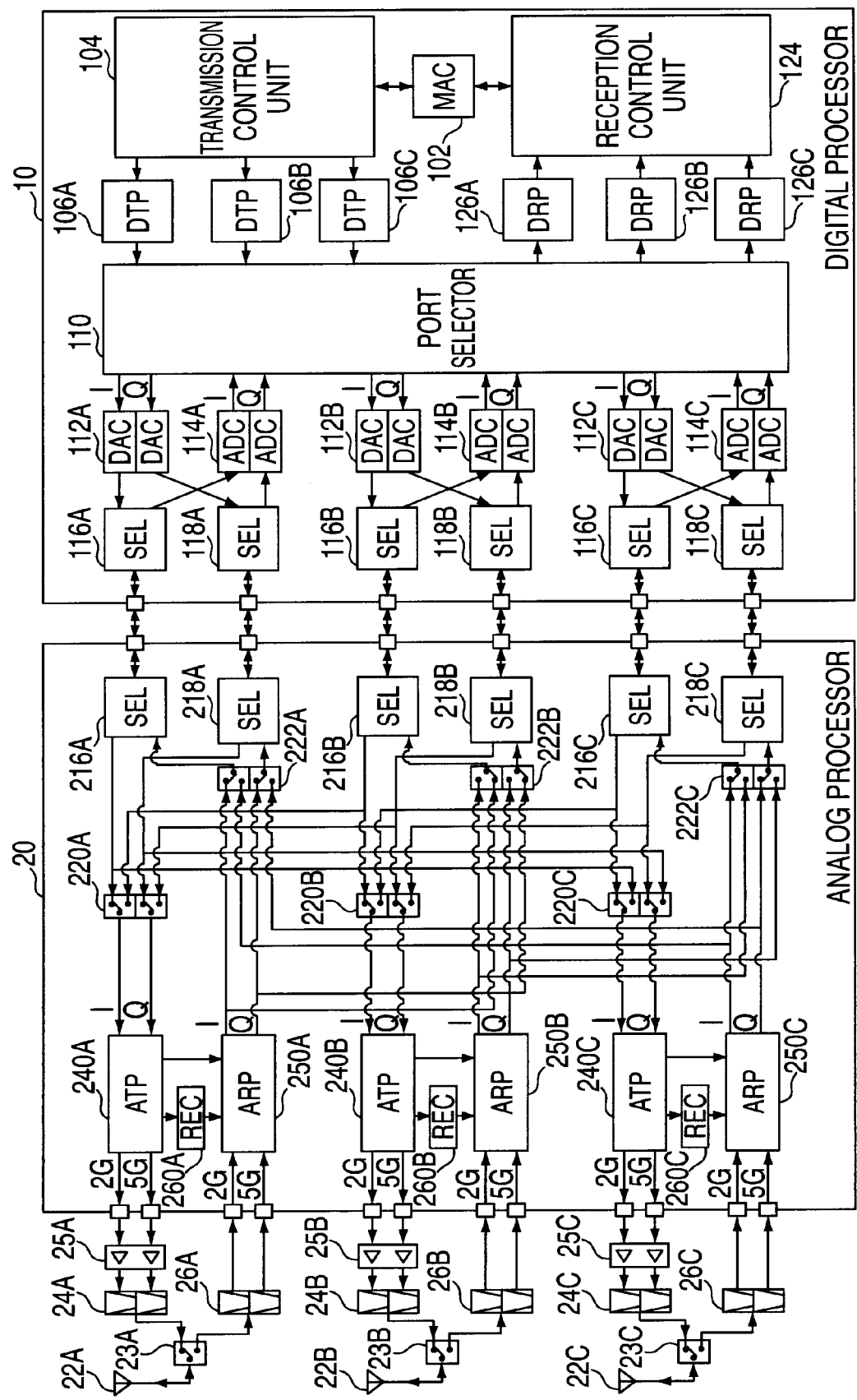
FIG. 13 is an explanatory view showing the state of switches in the wireless communication device at a time of the IQ calibration on a transmission side.
Figure 14:
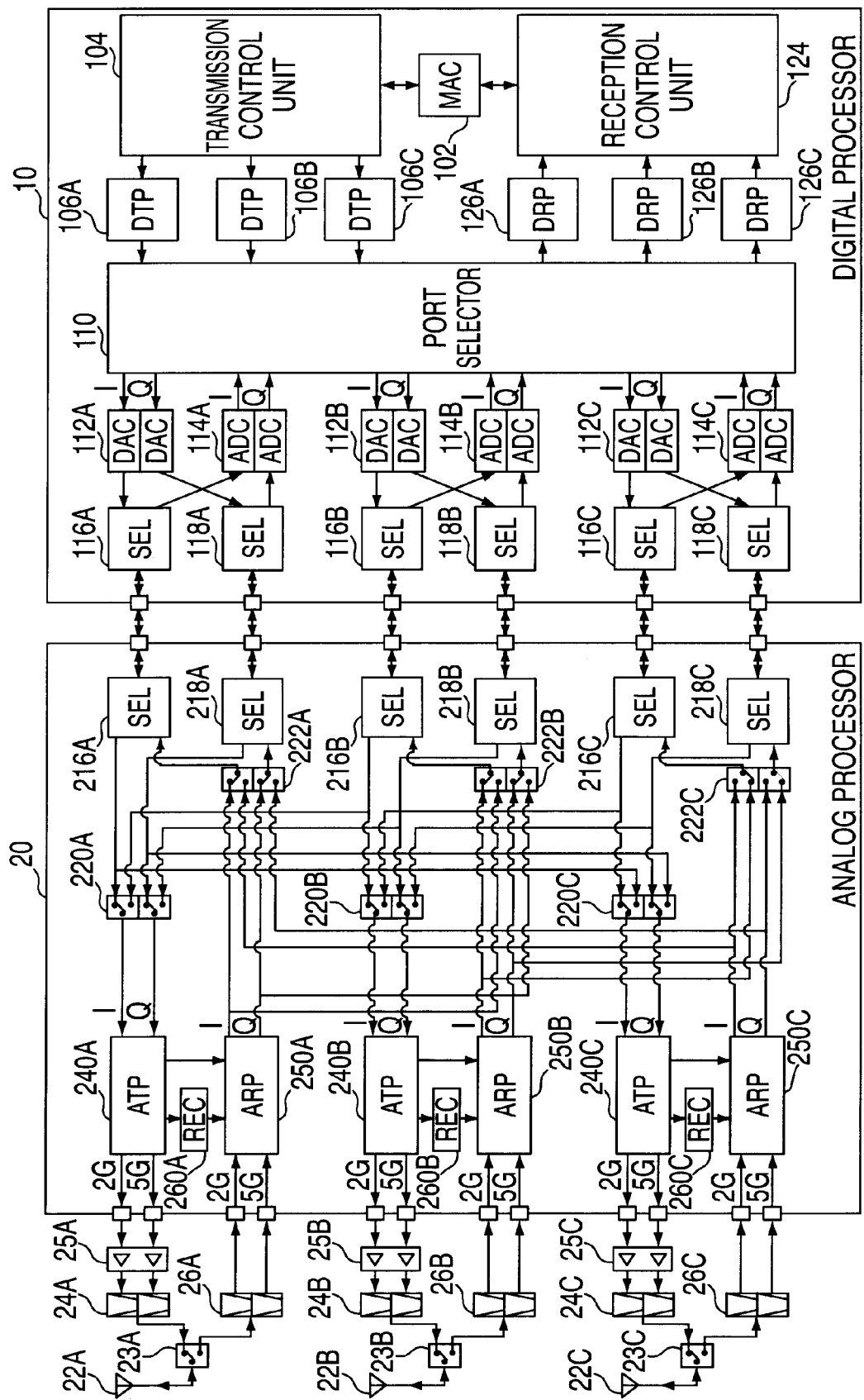
FIG. 14 is an explanatory view showing the state of switches in the wireless communication device at a time of the IQ calibration on the transmission side.
Figure 15:
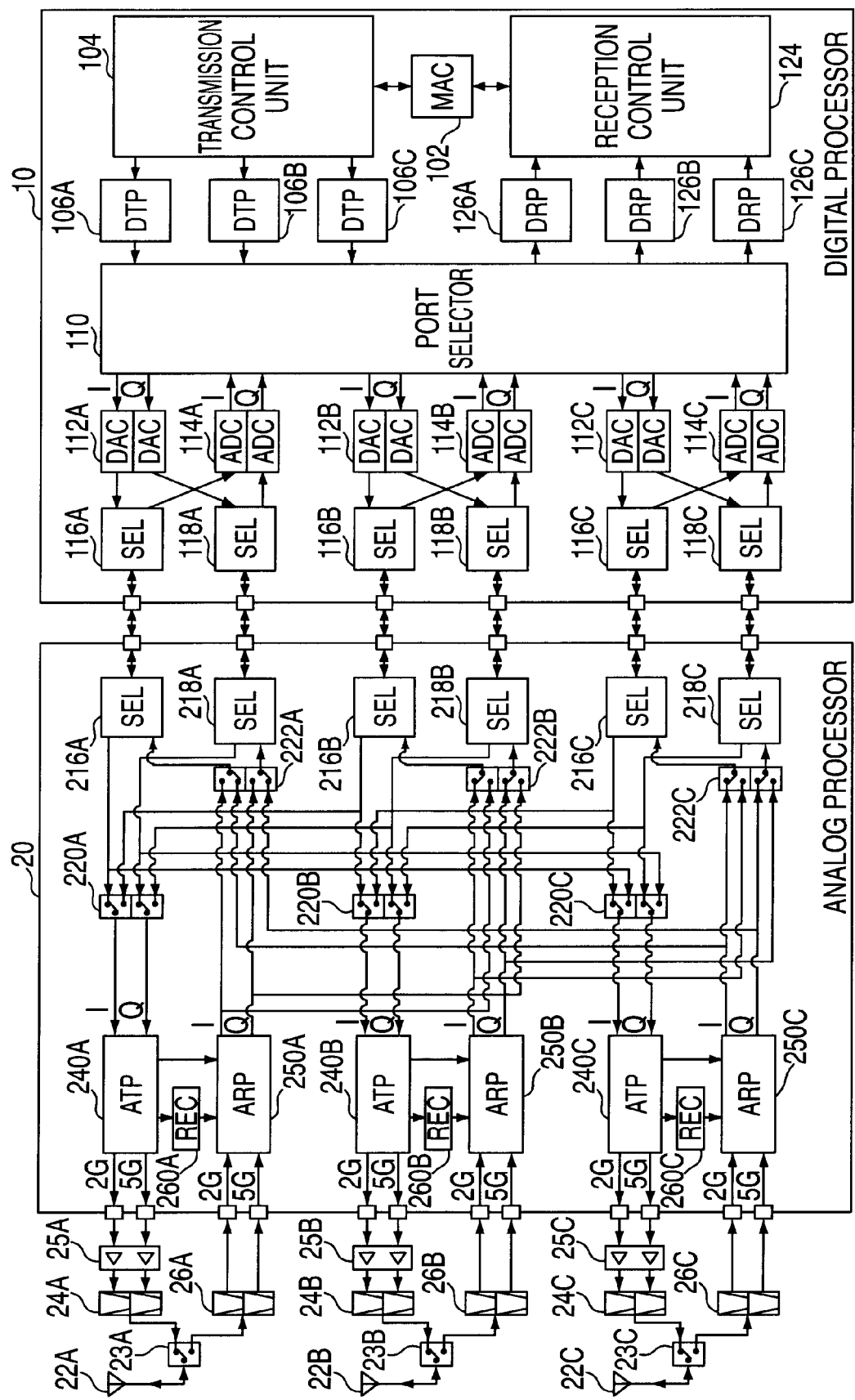
FIG. 15 is an explanatory view showing the state of switches in the wireless communication device at a time of the IQ calibration on the transmission side.

FIG. 13 to FIG. 15 are explanatory views showing the state of the switches in the wireless communication device 6 at a time of the IQ calibration on the transmitting side.

As shown in FIG. 13, at a time of the IQ calibration of the analog transmission processing unit 240A, the transmission switch 220A connects the analog transmission processing unit 240A to the DAC 112A and the reception switch 222B connects the analog reception processing unit 250A to the ADC 114B.

As the result, the reference signal arrives at the reception processing unit 124 passing through the DAC 112A, the analog transmission processing unit 240A, the rectifier 260A, the analog reception processing unit 250A, and the ADC 114B. Based on the arrived signal, for example, the transmission control unit 104 can calibrate the property errors of the DAC 112A and the analog transmission processing unit 240A.

As shown in FIG. 14, at a time of the IQ calibration of the analog transmission processing unit 240B, the transmission switch 220B connects the analog transmission processing unit 240B to the DAC 112B and the reception switch 222C connects the analog reception processing unit 250B to the ADC 114C.

As the result, the reference signal arrives at the reception processing unit 124 passing through the DAC 112B, the analog transmission processing unit 240B, the rectifier 260B, the analog reception processing unit 250B, and the ADC 114C. Based on the arrived signal, for example, the transmission control unit 104 can calibrate the property errors of the DAC 112B and the analog transmission processing unit 240B.

As shown in FIG. 15, at a time of the IQ calibration of the analog transmission processing unit 240C, the transmission switch 220C connects the analog transmission processing unit 240C to the DAC 112C and the reception switch 222A connects the analog reception processing unit 250C to ADC 114A.

As the result, the reference signal arrives at the reception processing unit 124 passing through the DAC 112C, the analog transmission processing unit 240C, the rectifier 260C, the analog reception processing unit 250C, and the ADC 114A. Based on the arrived signal, for example, the transmission control unit 104 can calibrate the property errors of the DAC 112C and the analog transmission processing unit 240C.

As shown in FIG. 13 to FIG. 15, since the IQ calibration on the transmitting side is sequentially performed in every analog transmission processing unit 240, the reference signal is processed in the digital transmission processing unit 106A. The returned signal is processed in the digital reception processing unit 106A.

Here, the turning is performed in the analog transmission processing unit 240 and the analog reception processing unit 250 which are connected to the same antenna 22 and the constraint (3) is satisfied. Further, the combination of the analog transmission processing unit 240 and the DAC 112 is the same as that at a time of the general wireless signal transmission shown in FIG. 11 and the constraint (2) is satisfied.

(At a Time of the IQ Calibration on the Receiving Side)

Figure 16:
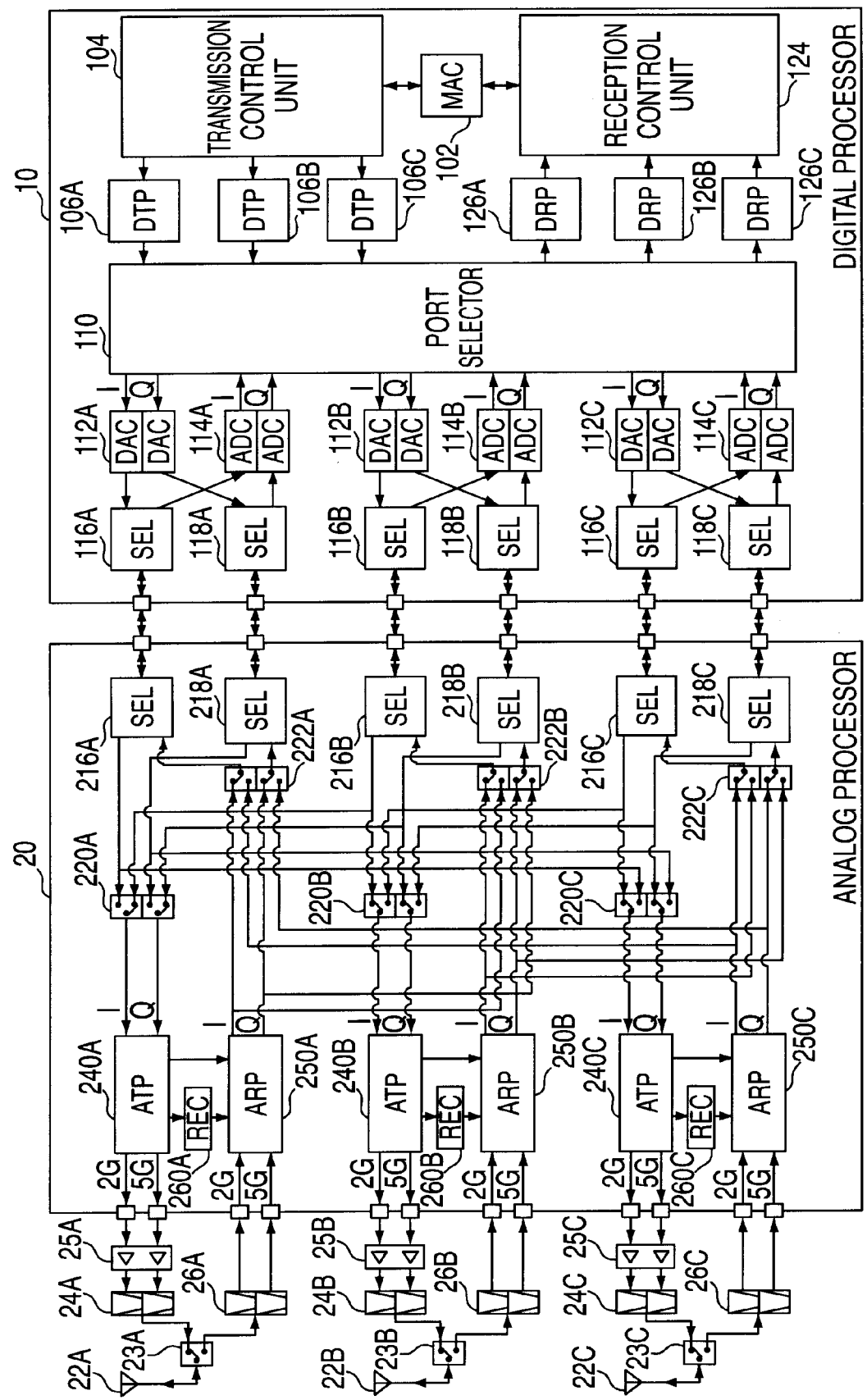
FIG. 16 is an explanatory view showing the state of switches in the wireless communication device at a time of the IQ calibration on the receiving side.
Figure 17:
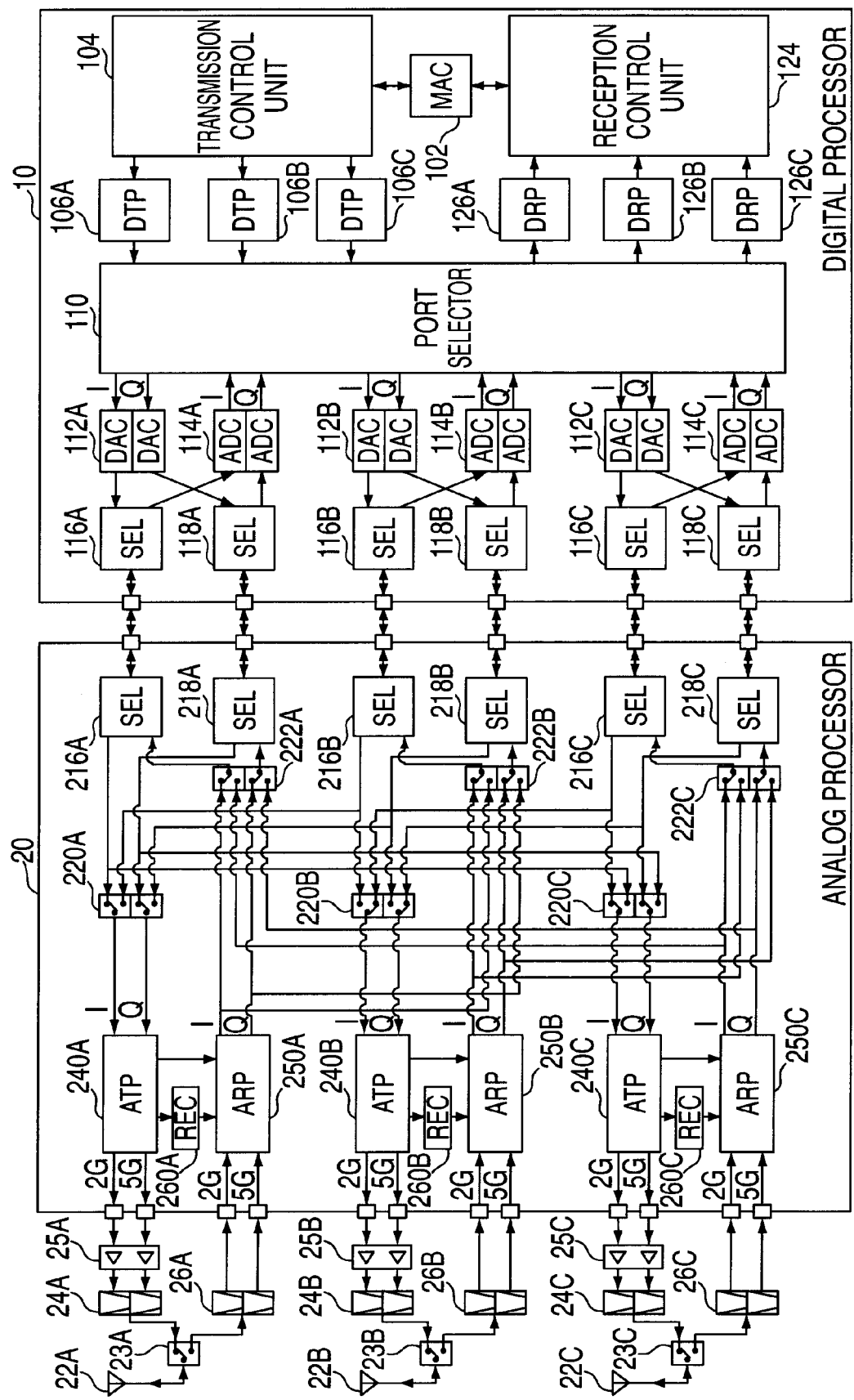
FIG. 17 is an explanatory view showing the state of switches in the wireless communication device at a time of the IQ calibration on the receiving side.
Figure 18:
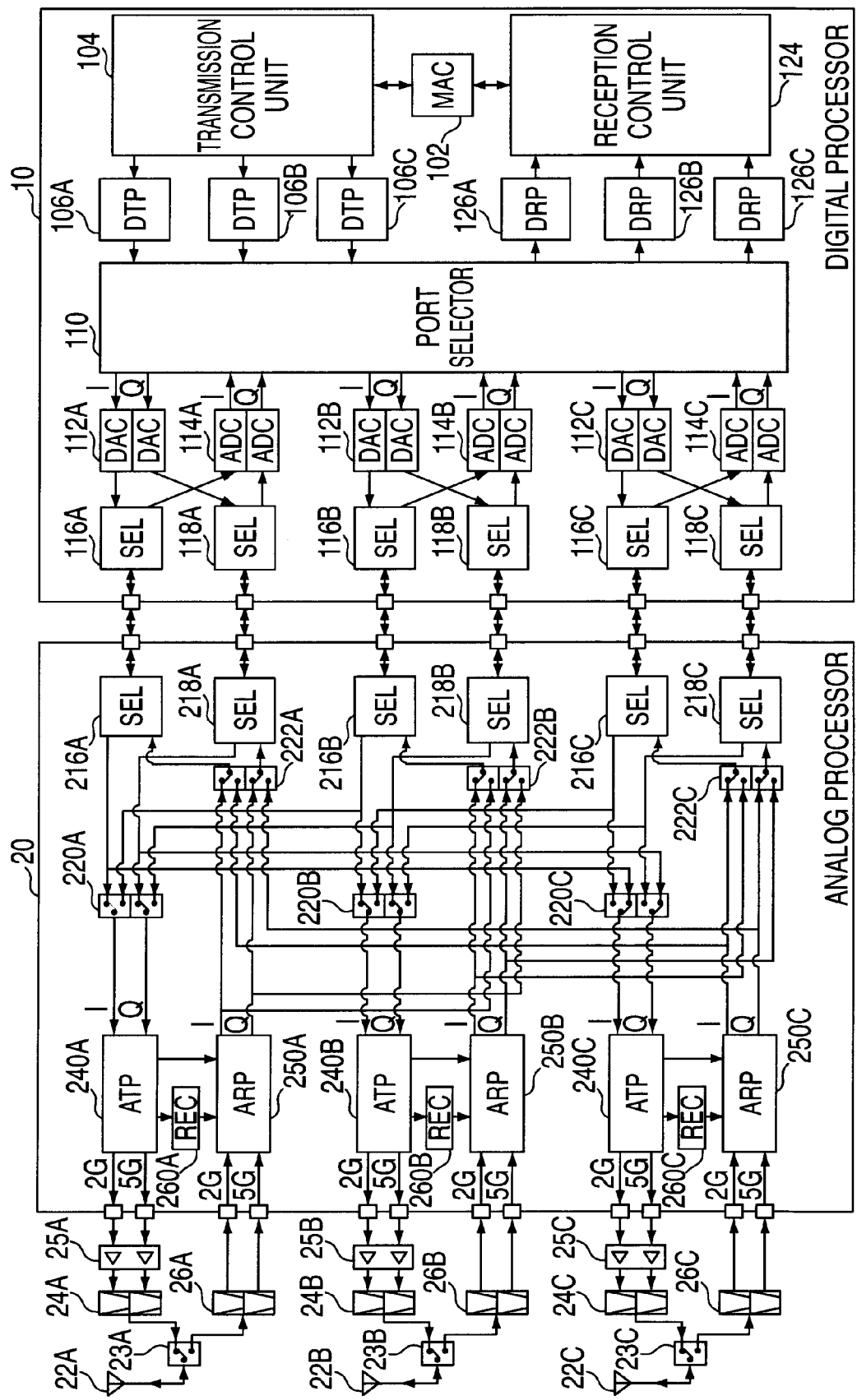
FIG. 18 is an explanatory view showing the state of switches in a wireless communication device 6 at a time of the IQ calibration on the receiving side.

FIG. 16 to FIG. 18 are explanatory views showing the state of the switches in the wireless communication device 6 at a time of the IQ calibration on the receiving side.

As shown in FIG. 16, at a time of the IQ calibration of the analog reception processing unit 250A, the reception switch 222A connects the analog reception processing unit 250A to the ADC 114A and the transmission switch 220A connects the analog transmission processing unit 240A to the DAC 112B.

As the result, the reference signal arrives at the reception processing unit 124 passing through the DAC 112B, the analog transmission processing unit 240A, the analog reception processing unit 250A, and the ADC 114A. Based on the arrived signal, for example, the reception control unit 124 can calibrate the property errors of the analog reception processing unit 250A and the ADC 114A.

As shown in FIG. 17, at a time of the IQ calibration of the analog reception processing unit 250B, the reception switch 222B connects the analog reception processing unit 250B to the ADC 114B and the transmission switch 220B connects the analog transmission processing unit 240B to the DAC 112C.

As the result, the reference signal arrives at the reception processing unit 124 passing through the DAC 112C, the analog transmission processing unit 240B, the analog reception processing unit 250B, and the ADC 114B. Based on the arrived signal, for example, the reception control unit 124 can calibrate the property errors of the analog reception processing unit 250B and the ADC 114B.

As shown in FIG. 18, at a time of the IQ calibration of the analog reception processing unit 250C, the reception switch 222C connects the analog reception processing unit 250C to the ADC 114C and the transmission switch 220C connects the analog transmission processing unit 240C to the DAC 112A.

As the result, the standard signal arrives at the reception processing unit 124 passing through the DAC 112A, the analog transmission processing unit 240C, the analog reception processing unit 250C, and the ADC 114C. Based on the arrived signal, for example, the reception control unit 124 can calibrate the property errors of the analog reception processing unit 250C and the ADC 114C.

Here, the turning is performed in the analog transmission processing unit 240 and the analog reception processing unit 250 which are connected to the same antenna 22 and the constraint (3) is satisfied. Further, the combination of the analog reception processing unit 250 and the ADC 114 is the same as that at a time of the general wireless signal reception shown in FIG. 12 and the constraint (2) is also satisfied.

(At a Time of the Antenna Calibration)

Figure 19:
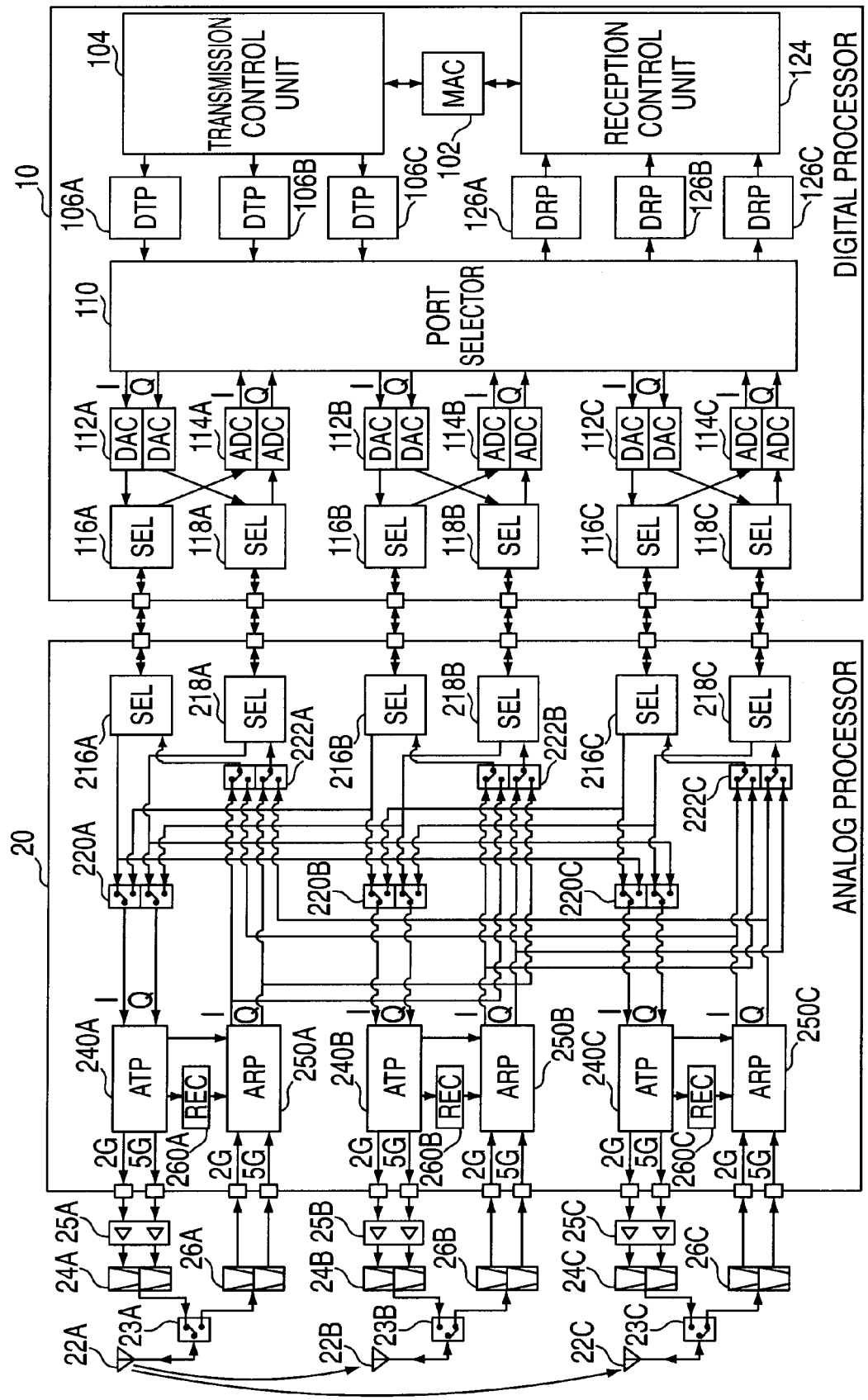
FIG. 19 is an explanatory view showing the state of switches in the wireless communication device in the first step of antenna calibration.
Figure 20:
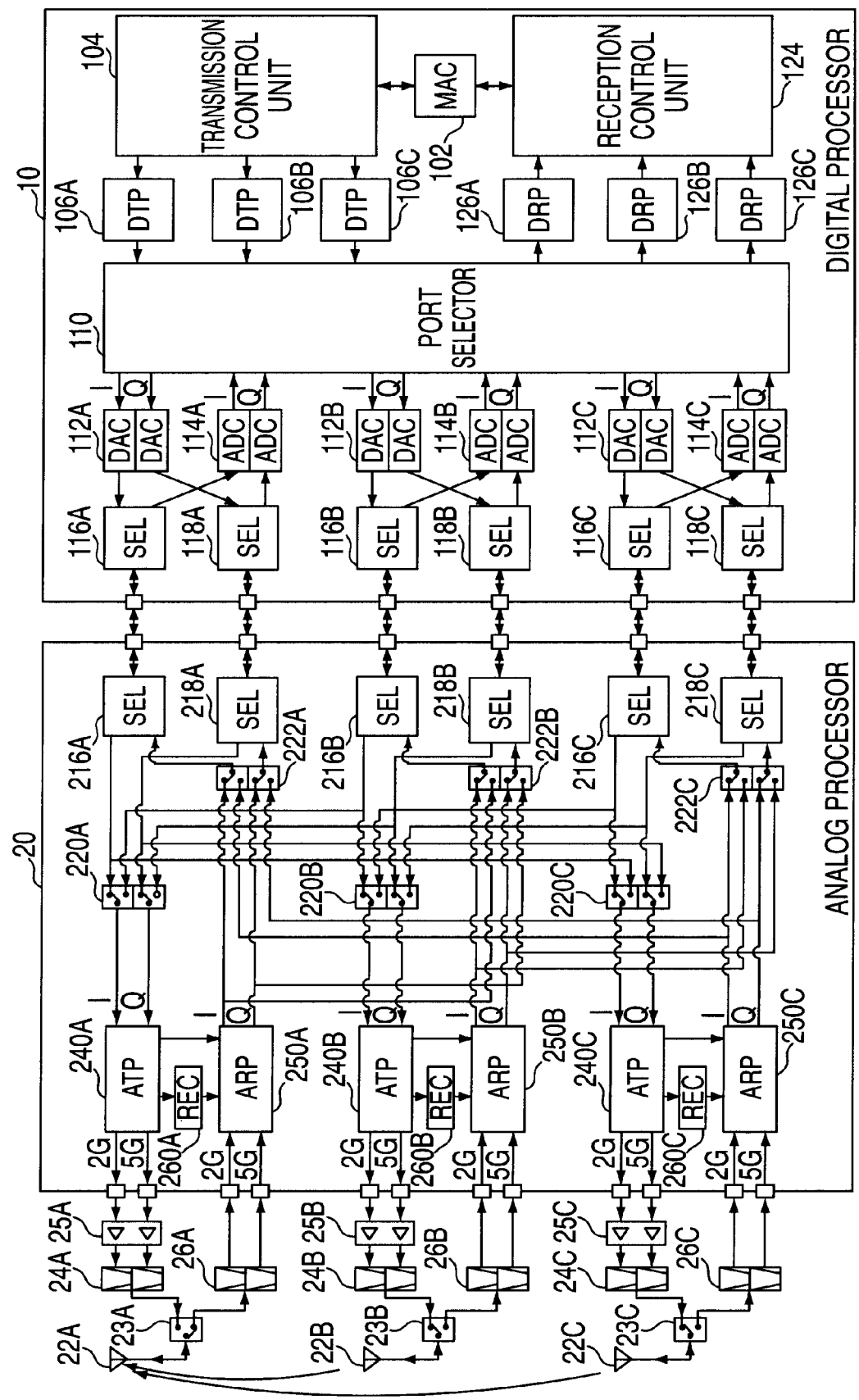
FIG. 20 is an explanatory view showing the state of switches in the wireless communication device in the second step of the antenna calibration.

FIG. 19 is an explanatory view showing the state of the switches in the wireless communication device 6 in the first step of the antenna calibration. FIG. 20 is an explanatory view showing the state of the switches in the wireless communication device 6 in the second step of the antenna calibration.

As shown in FIG. 19, at a time of the first step of the antenna calibration, the transmission switch 220A connects the analog transmission processing unit 240A to the DAC 112A. The reception switch 222B connects the analog reception processing unit 250B and the ADC 114B and the reception switch 222C connects the analog reception processing unit 250C to the ADC 114C.

As the result, the reference signal is transmitted passing through the DAC 112A, the analog transmission processing unit 240A, and the antenna 22A. Then, the reference signal arrives at the reception control unit 124 passing through the antenna 22B, the analog reception processing unit 250B, and the ADC 114B. In the same way, the reference signal arrives at the reception control unit 124 passing through the antenna 22C, the analog reception processing unit 250C, and the ADC 114C and the reception control unit 124 obtains the loopback transfer functions D (A, B) and D (A, C).

As shown in FIG. 20, at a time of the second step of the antenna calibration, the transmission switch 220B connects the analog transmission processing unit 240B to the DAC 112B and the transmission switch 220C connects the analog transmission processing unit 240C to the DAC 112C. The reception switch 222A connects the analog reception processing unit 250A to the ADC 114A.

As the result, the reference signal is transmitted passing through the DAC 112B, the analog transmission processing unit 240B, and the antenna 22B. Further, the reference signal is transmitted passing through the DAC 112C, the analog transmission processing unit 240C, and the antenna 22C. Then, both the reference signals arrive at the reception control unit 124 passing through the antenna 22A, the analog reception processing unit 250A, and the ADC 114A and the reception control unit 124 obtains the loopback transfer functions D (B, A) and D (C, A).

The digital processor 10 of the wireless communication device 6 can calculate the correction coefficient K based on the loopback transfer function D obtained in the first step and the second step. Here, since the combination of the analog transmission processing unit 240 and the DAC 112 and the combination of the analog reception processing unit 250 and the ADC 114 are the same as those in the general wireless communication, the constraint (1) is satisfied.

Switching of the switches is conceptually described as follows. The combination of the analog transmission processing unit 240 and the DAC 112 in the general wireless communication is referred to as the first transmission combination and the combination of the analog reception processing unit 250 and the ADC 114 is referred to as the first reception combination. In this case, in the antenna calibration, the transmission switch defines the combination of the analog transmission processing unit 240 and the DAC 112 as the first transmission combination and the reception switch defines the combination of the analog reception processing unit 250 and the ADC 114 as the first reception combination.

In the IQ calibration on the transmitting side, the transmission switch defines the combination of the analog transmission processing unit 240 and the DAC 112 as the first transmission combination and the reception switch defines the combination of the analog reception processing unit 250 and the ADC 114 as the second reception combination different from the first reception combination. Further, in the IQ calibration on the receiving side, the transmission switch defines the combination of the analog transmission processing unit 240 and the DAC 112 as the second transmission combination different as the first transmission combination and the reception switch defines the combination of the analog reception processing unit 250 and the ADC 114 as the first reception combination.

[2-5] Operation of Wireless Communication Device

As mentioned above, a function of the wireless communication device 6 according to the embodiment will be described referring to FIG. 2 to FIG. 20. Next, the operation of the wireless communication device 6 according to the embodiment will be described referring to FIG. 21.

Figure 21:
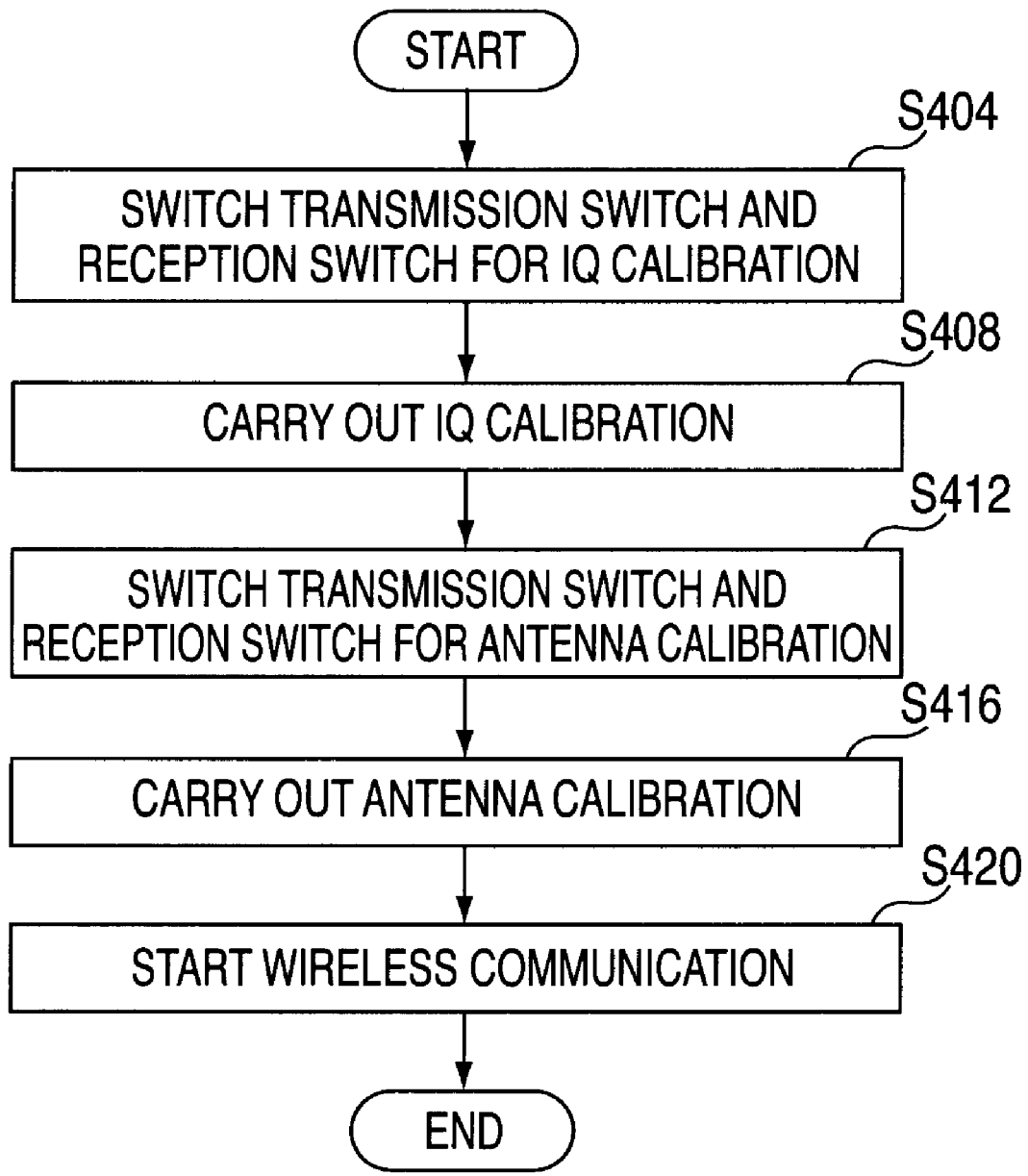
FIG. 21 is a flow chart showing the flow of a control method carried out in the wireless communication device according to the embodiment.

FIG. 21 is a flow chart showing a flow of a control method carried out in the wireless communication device 6 according to the embodiment. As shown in FIG. 21, the control units such as the transmission control unit 104 and the reception control unit 124 in the wireless communication device 6 switch the transmission switch 220 and the reception switch 222 to the IQ calibration mode (S404). Next, the wireless communication device 6 carries out the IQ calibration on the transmitting side and the receiving side (S408).

Then, the control units such as the transmission control unit 104 and the reception control unit 124 switch the transmission switch 220 and the reception switch 222 to the antenna calibration mode (S412). Next, the wireless communication device 6 carries out the antenna calibration (S416). Then, the wireless communication device 6 starts a wireless communication, for example, with the wireless communication device 6' of the other party (S420).

[3] CONCLUSION

As mentioned above, the wireless communication device 6 according to the embodiment is provided with the transmission switches 220 and the reception switches 222 at six positions in total. Owing to the structure, even in the wireless communication device 6 sharing a path for transmission signal and reception signal, the IQ calibration and the antenna calibration can be performed with the constraint satisfied by switching the transmission switches 220 and the reception switches 222 properly.

It should be understood by those skilled in the art that various modifications, combinations, sub-combinations and alterations may occur depending on design requirements and other factors insofar as they are within the scope of the appended claims or the equivalents thereof.

For example, in the embodiment, although the description has been made in the case where the wireless communication device 6 is provided with three processing groups, the invention is not limited to this example. For example, the wireless communication device 6 may have two processing groups or four and more. The structure example of the wireless communication device 6 when the wireless communication device 6 has two processing groups is shown in FIG. 22.

Figure 22:
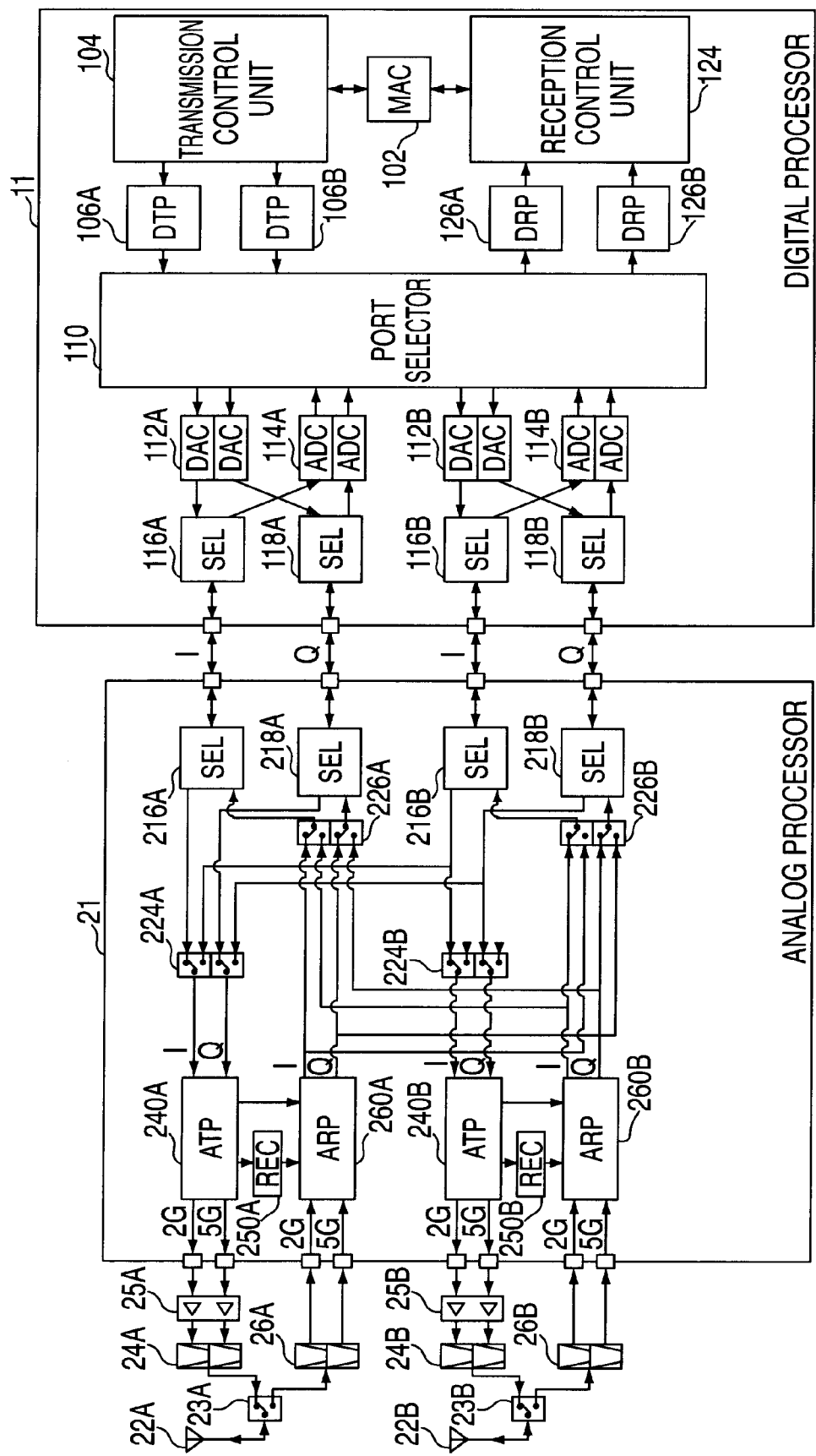
FIG. 22 is an explanatory view showing a modification example of the wireless communication device according to the embodiment.

FIG. 22 is an explanatory view showing a modification example of the wireless communication device 6 according to the embodiment. As shown in FIG. 22, the wireless communication device 6 according to the modification example includes each two of the antennas 22, the analog transmission processing units 240, the analog reception processing units 250, the DACs 112, the ADCs 114, the digital transmission processing units 106, and the digital reception processing units 126. Since the wireless communication device 6 according to the modification example includes the transmission switches 224A and 224B and the reception switches 226A and 226B, the effect described in the above mentioned "[2] Detailed Description of Wireless Communication Device Forming Wireless Communication System" can be obtained. In other words, according to the modification example, since the combination of the analog transmission processing unit 240 and the DAC 112 and the combination of the analog reception processing unit 250 and the ADC 114 can be changed properly, the IQ calibration and the antenna calibration with the constraints satisfied can be realized.

In the above mentioned embodiment, although the above embodiment has been described in the case where the analog transmission processing unit 240 and the DAC 112 respectively with the same alphabet attached are connected to each other at a time of the general wireless signal transmission, the invention is not limited to this example. It is the same also at a time of the general wireless signal reception.

What is claimed is:

1. A signal processor, comprising:
    a plurality of analog reception processing units;
    a plurality of AD converters;
    a plurality of DA converters; and
    a plurality of analog transmission processing units,
        wherein the signal processor is connected to a plurality of antennas for transmitting and receiving wireless signals,
    each of the analog reception processing units shifts a frequency band of the wireless signal received through the connected antenna to a low frequency side to generate an analog baseband signal and outputs the analog baseband signal from an output terminal,
    each of the AD converters converts the analog baseband signal generated by the connected analog reception processing unit into a digital baseband signal and outputs the digital baseband signal,
    each of the DA converters converts the input digital baseband signal into an analog baseband signal and outputs the analog baseband signal, and
    each of the analog transmission processing units shifts the frequency band of the analog baseband signal output from the connected DA converter to a high frequency side,
    the signal processor further including:
    a transmission switch which switches among the DA converters connected to the respective analog transmission processing units; and
    a reception switch which switches among the AD converters connected to the respective analog reception processing units.

2. The signal processor according to claim 1, further comprising:
    a property calibration unit which calibrates a property of at least one of the analog reception processing unit, the AD converter, the DA converter, the analog transmission processing unit, and the antenna; and
    a control unit which controls the transmission switch and the reception switch according to a target property to be calibrated by the property calibration unit.

3. The signal processor according to claim 2, further comprising
    a plurality of rectifiers which rectify the signals obtained by shifting the analog baseband signals to the high frequency side by the respective analog transmission processing units and which are arranged so that each outputs the rectified signal from an output terminal of the analog reception processing unit connected to the same antenna as the analog transmission processing unit, wherein
    in property calibration of the first analog transmission processing unit and the first DA converter by the property calibration unit,
    the control unit connects the first analog transmission processing unit and the first DA converter to the transmission switch and connects the first analog reception processing unit, connected to the same antenna as the first analog transmission processing unit, which outputs the signal rectified by the rectifier from the output terminal and the second AD converter to the reception switch, and
    in property calibration of the first analog reception processing unit and the first AD converter by the property calibration unit,
    the control unit connects the first analog transmission processing unit and the second DA converter to the transmission switch and connects the first analog reception processing unit which the signal obtained by shifting the analog baseband signal to the high frequency side by the first analog transmission processing unit inputs and the first AD converter to the reception switch.

4. The signal processor according to claim 3, wherein
    in the calibration of the antenna property by the property calibration unit,
    as a first step,
    the control unit connects the first analog transmission processing unit and the first DA converter to the transmission switch and connects the second analog reception processing unit which is connected to the second antenna for receiving the wireless signal from the first antenna connected to the first analog transmission processing unit and the second AD converter to the reception switch, and
    as a second step, the control unit connects the second analog transmission processing unit connected to the second antenna and the second DA converter to the transmission switch and connects the first analog reception processing unit which is connected to the first antenna for receiving the wireless signal transmitted from the second antenna and the first AD converter to the reception switch.

5. The signal processor according to claim 4, wherein the control unit connects the first analog transmission processing unit and the first DA converter to the transmission switch during a transmission period of the wireless signal from the first antenna to another wireless communication device, and connects the first analog reception processing unit and the first AD converter to the reception switch during a reception period of the wireless signal from another wireless communication device through the first antenna.

6. The signal processor according to claim 2, further comprising:

a plurality of digital reception processing units which respectively convert the digital baseband signal output from the connected AD converter into a bit string;

a plurality of digital transmission processing units which respectively generate the digital baseband signal and output the signal to the connected DA converter; and the switching unit which switches among the digital reception processing units respectively connected to the AD converters and among the digital transmission processing units respectively connected to the DA converters.

7. A control method that is carried out in a signal processor having a plurality of analog reception processing units, AD converters, DA converters, and analog transmission processing units, the signal processor being connected to a plurality of antennas for transmitting and receiving wireless signals, in which each of the analog reception processing units shifts a frequency band of the wireless signal received by the connected antenna to a low frequency side to generate an analog baseband signal and outputs the analog baseband signal from an output terminal, each of the AD converters converts the analog baseband signal generated by the connected analog reception processing unit into a digital baseband signal and outputs the digital baseband signal, each of the DA converters converts the input digital baseband signal into an analog baseband signal and outputs the analog baseband signal, and each of the analog transmission processing units shifts the frequency band of the analog baseband signal output from the connected DA converter to a high frequency side, the method comprising:

a step of switching among the DA converters connected to the respective analog transmission processing units and switching among the AD converters connected to the respective analog reception processing units, depending on a target property for calibration.

8. A wireless communication device having a MIMO communication function, comprising:

a plurality of antennas;

a plurality of analog reception processing units;

a plurality of AD converters;

a plurality of DA converters; and a plurality of analog transmission processing units, wherein each of the analog reception processing units shifts a frequency band of the wireless signal received through the connected antenna to a low frequency side to generate an analog baseband signal and outputs the analog baseband signal from an output terminal, each of the AD converters converts the analog baseband signal generated by the connected analog reception processing unit into a digital baseband signal and outputs the digital baseband signal, each of the DA converters converts the input digital baseband signal into an analog baseband signal and outputs the analog baseband signal, and each of the analog transmission processing units shifts the frequency band of the analog baseband signal output from the connected DA converter to a high frequency side, the wireless communication device further including:

a transmission switch which switches among the DA converters respectively connected to the analog transmission processing units;

a reception switch which switches among the AD converters respectively connected to the analog reception processing units.

* * * * *